(12) United States Patent
Liu et al.

(10) Patent No.: US 12,507,061 B2
(45) Date of Patent: *Dec. 23, 2025

(54) SECURITY CERTIFICATE MANAGEMENT AND MISBEHAVIOR VEHICLE REPORTING IN VEHICLE-TO-EVERYTHING (V2X) COMMUNICATION

(71) Applicant: Intel Corporation, Santa Clara, CA (US)

(72) Inventors: Xiruo Liu, Portland, OR (US); Liuyang Yang, Vancouver, WA (US); Leonardo Gomes Baltar, Munich (DE); Moreno Ambrosin, Hillsboro, OR (US); Manoj R. Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 389 days.

This patent is subject to a terminal disclaimer.

(21) Appl. No.: 17/865,089

(22) Filed: Jul. 14, 2022

(65) Prior Publication Data

US 2023/0018402 A1 Jan. 19, 2023

Related U.S. Application Data

(63) Continuation of application No. 16/729,077, filed on Dec. 27, 2019, now Pat. No. 11,445,362.

(Continued)

(51) Int. Cl.
*H04L 29/06* (2006.01)
*H04L 9/32* (2006.01)
(Continued)

(52) U.S. Cl.
CPC ......... *H04W 12/009* (2019.01); *H04L 9/3268* (2013.01); *H04W 4/40* (2018.02);
(Continued)

(58) Field of Classification Search
CPC ....... H04W 12/009; H04W 4/40; H04W 4/80; H04W 12/069; H04W 12/106;
(Continued)

(56) References Cited

U.S. PATENT DOCUMENTS

| 10,086,782 B1 * | 10/2018 | Konrardy | B60W 30/16 |
| 10,556,600 B2 * | 2/2020 | James | B60W 50/14 |

(Continued)

FOREIGN PATENT DOCUMENTS

| CN | 104380349 A * | 2/2015 | ............... B60Q 1/00 |
| CN | 105637803 A * | 6/2016 | ........... B60R 25/307 |

(Continued)

OTHER PUBLICATIONS

"IEEE Standard for Wireless Access in Vehicular Environments: Security Services for Applications and Management Messages", 2016, 240 pages, IEEE Std 1609.2, New York, NY.

(Continued)

*Primary Examiner* — Sher A Khan
(74) *Attorney, Agent, or Firm* — Schwabe, Williamson & Wyatt, P.C.

(57) ABSTRACT

The present disclosure describe methods, apparatuses, storage media, and systems for a device disposed at an edge of a vehicular communication network or vehicles within a coverage area of the device. The device is to generate a list of vehicle security data to be distributed to vehicles currently within a coverage area of the device, based at least in part on a context related to the vehicles. The device is further to announce, on a control channel communicatively coupling the device and the vehicles, that the list of vehicle security data are available and a service channel to receive the list of vehicle security data. The list of vehicle security data are to be provided to the vehicles via the service channel. Other embodiments may be described and claimed.

29 Claims, 18 Drawing Sheets

Related U.S. Application Data

(60) Provisional application No. 62/817,452, filed on Mar. 12, 2019, provisional application No. 62/812,509, filed on Mar. 1, 2019.

(51) Int. Cl.
  *H04W 4/40* (2018.01)
  *H04W 4/80* (2018.01)
  *H04W 12/00* (2021.01)
  *H04W 12/069* (2021.01)
  *H04W 12/106* (2021.01)
  *H04W 12/64* (2021.01)
  *H04W 72/20* (2023.01)

(52) U.S. Cl.
  CPC .......... *H04W 4/80* (2018.02); *H04W 12/069* (2021.01); *H04W 12/106* (2021.01); *H04W 12/64* (2021.01); *H04W 72/20* (2023.01)

(58) Field of Classification Search
  CPC ....... H04W 12/64; H04W 72/20; H04W 4/20; H04W 4/44; H04L 9/3268; H04L 2209/80; H04L 2209/84; H04L 9/3215
  See application file for complete search history.

(56) References Cited

U.S. PATENT DOCUMENTS

| | | | | |
|---|---|---|---|---|
| 10,796,501 | B2 * | 10/2020 | Cheng | H04Q 9/00 |
| 10,878,701 | B2 * | 12/2020 | Damsaz | G08G 1/166 |
| 11,445,362 | B2 * | 9/2022 | Liu | H04W 12/069 |
| 11,553,346 | B2 * | 1/2023 | Yang | G05D 1/0088 |
| 2008/0232583 | A1 * | 9/2008 | Di Crescenzo | H04W 12/122 380/44 |
| 2008/0232595 | A1 * | 9/2008 | Pietrowicz | H04L 9/3297 380/277 |
| 2012/0034876 | A1 * | 2/2012 | Nakamura | H04W 12/06 455/66.1 |
| 2013/0135092 | A1 * | 5/2013 | Wu | B60Q 9/00 340/439 |
| 2014/0213238 | A1 * | 7/2014 | Giraud | G07C 5/008 455/418 |
| 2015/0120188 | A1 * | 4/2015 | Jung | G08G 1/20 701/468 |
| 2016/0140842 | A1 * | 5/2016 | Park | G08G 1/0112 340/905 |
| 2016/0335897 | A1 * | 11/2016 | Naserian | H04W 4/46 |
| 2017/0222990 | A1 * | 8/2017 | Romansky | H04L 9/3268 |
| 2017/0244565 | A1 * | 8/2017 | Bronk | H04W 12/106 |
| 2017/0277884 | A1 * | 9/2017 | Hsu | H04W 12/082 |
| 2017/0337068 | A1 * | 11/2017 | Maria | H04W 4/40 |
| 2017/0359365 | A1 * | 12/2017 | van den Berg | H04W 4/20 |
| 2018/0249478 | A1 * | 8/2018 | Kumabe | H04W 4/40 |
| 2018/0338001 | A1 * | 11/2018 | Pereira Cabral | H04L 67/141 |
| 2018/0376305 | A1 * | 12/2018 | Ramalho de Oliveira | H04W 4/44 |
| 2019/0044738 | A1 | 2/2019 | Liu et al. | |
| 2019/0096144 | A1 * | 3/2019 | Noh | H04W 12/66 |
| 2019/0171208 | A1 * | 6/2019 | Magalhães de Matos | G06N 20/00 |
| 2019/0245705 | A1 * | 8/2019 | Kumar | H04L 63/065 |
| 2019/0312896 | A1 * | 10/2019 | Petit | H04W 4/46 |
| 2020/0029268 | A1 * | 1/2020 | Russell | H04W 12/06 |
| 2020/0106624 | A1 * | 4/2020 | Russell | H04W 12/37 |
| 2020/0336908 | A1 * | 10/2020 | Kim | H04W 12/062 |
| 2021/0144003 | A1 * | 5/2021 | Arzelier | H04L 9/3263 |

FOREIGN PATENT DOCUMENTS

| | | | | |
|---|---|---|---|---|
| CN | 107258093 | A * | 10/2017 | G01S 5/0072 |
| CN | 110679168 | A * | 1/2020 | H04L 9/3268 |
| CN | 111200799 | A * | 5/2020 | H04L 63/00 |
| CN | 109314646 | B * | 7/2021 | H04W 12/069 |
| CN | 112771905 | B * | 3/2024 | H04L 63/0823 |
| DE | 102011016513 | A1 * | 11/2011 | H04L 63/0823 |
| DE | 102014110958 | A1 * | 4/2015 | B60Q 1/525 |
| DE | 102019103419 | A1 * | 10/2019 | H04L 9/006 |
| EP | 3485480 | B1 * | 10/2023 | H04W 40/38 |
| JP | 2019176258 | A * | 10/2019 | H04W 4/48 |
| WO | WO-2016165742 | A1 * | 10/2016 | G06F 17/11 |

OTHER PUBLICATIONS

"IEEE Standard for Wireless Access in Vehicular Environments (WAVE)—Multi-Channel Operation", 89 pages, 2010, IEEE Std 1609.4, New York, NY.

"DSRC Implementation Guide: A guide to users of SAE J2735 message sets over DSRC", 2010, 210 pages, SAE International.

"IEEE Guide for Wireless Access in Vehicular Environments (WAVE) Architecture", 2013, 78 pages, IEEE Std 1609.0, New York, NY.

Kezhu Hong et al., "Evaluation of Multi-Channel Schemes for Vehicular Safety Communications", 5 pages, 2010, IEEE 71st Vehicular Technology Conference.

N. Bissmeyer, "Misbehavior Detection and Attacker Identification in Vehicular Ad hoc Networks", Nov. 2014, 211 pages, PhD Thesis.

Marion Vasseur et al., "Misbehavior Detection in Cooperative Intelligent Transport Systems (ITS)", 2016, 24 bages.

C-ITS Platform "Final Report and WG5: Security & Certification Final Report Annex II Revocation of trust in Cooperative—Intelligent Transport Systems (C-ITS)", Jan. 26, 2016, 168 pages, v1.0.

\* cited by examiner

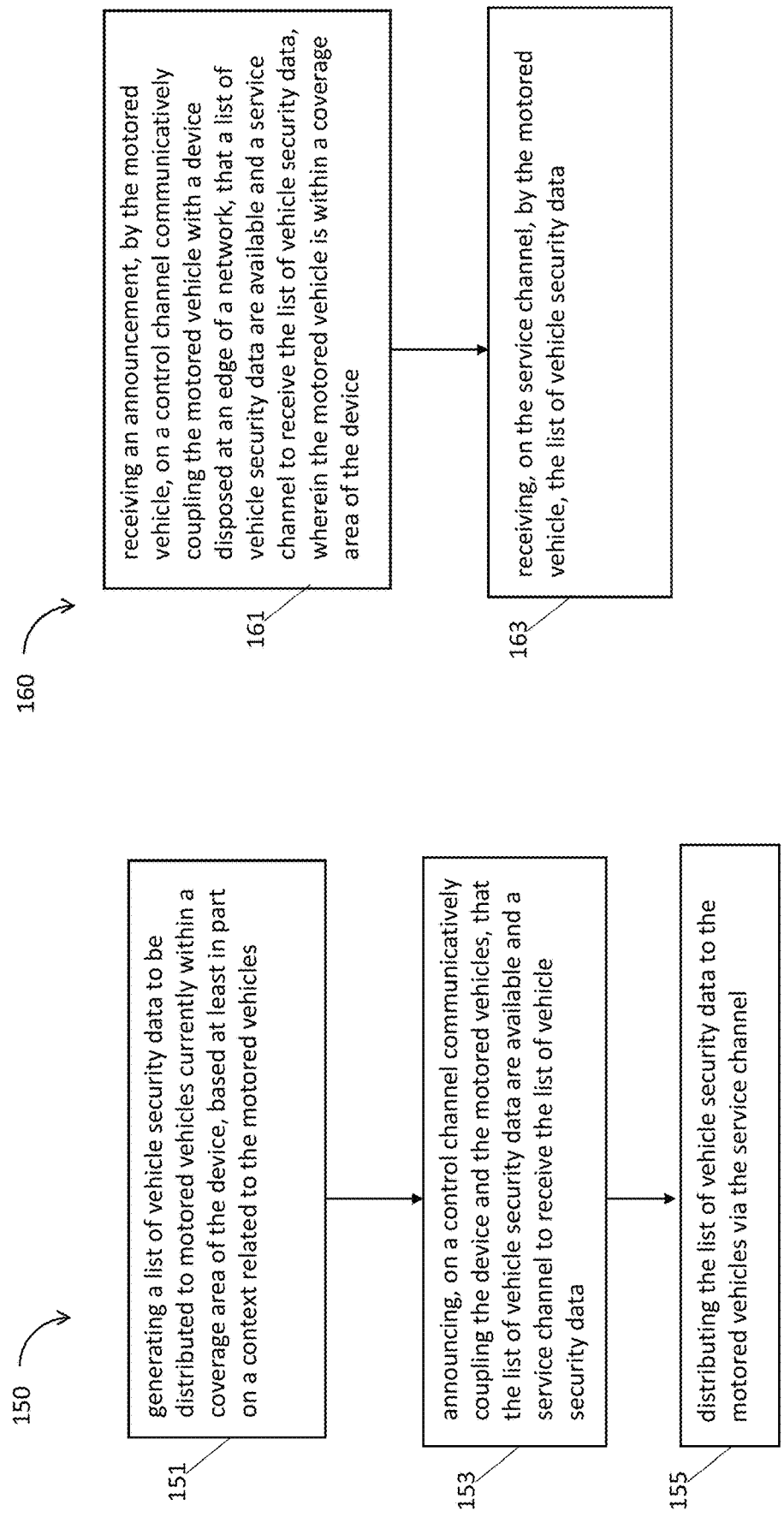

SECURITY CERTIFICATE MANAGEMENT AND MISBEHAVIOR VEHICLE REPORTING IN VEHICLE-TO-EVERYTHING (V2X) COMMUNICATION

CROSS REFERENCE TO RELATED APPLICATION

The present application is a continuation of U.S. application Ser. No. 16/729,077 filed Dec. 27 2019, which claims priority to U.S. Provisional App. No. 62/817,452 filed on Mar. 12, 2019, and U.S. Provisional App. No. 62/812,509 filed on Mar. 1, 2019, the contents of each of which are hereby incorporated by reference herein in their entireties and for all purposes.

TECHNICAL FIELD

The present disclosure relates to the field of vehicular communication. More particularly, the present disclosure relates to security management of vehicular communication, and to misbehavior vehicle reporting.

BACKGROUND

Vehicular communication is one of the building blocks to turn autonomous driving into reality. Vehicle-to-everything (V2X) communication is a communication paradigm that enables the information exchange between entities in vehicular environments, e.g., vehicles, roadside units (RSUs), pedestrians, and the infrastructure. V2X communication complements the onboard sensors used for autonomous driving, enabling cars to understand the surrounding environments beyond the immediate range reachable by onboard sensors such as radar, Light Detection and Ranging (LIDAR) and camera etc. V2X communication facilitates information sharing between vehicles, e.g., vehicle-to-vehicle (V2V), pedestrians, and RSUs in the proximity through V2X messages. As such, V2X communication plays an important role for intelligent transportation systems that may include safety-critical applications, vehicular infotainment systems, local cooperative driving, or large scale traffic managements.

While being valuable for autonomous driving, V2X communication may make the vehicular communication system more vulnerable to attacks or threats. In a V2X security framework, authenticity and integrity of messages exchanged over V2X communication may potentially be enhanced by digital signatures. A credentials management infrastructure, such as the Secure Credentials Management System (SCMS) in the U. S, may involve certificate authority (CA) to distribute V2X security certificates to the legitimate users. A sender vehicle signs a message using a secret key associated to a security certificate. A receiver can verify the authenticity and integrity of a message by verifying the validity of the security certificate and the signature.

In addition, in a V2X system, a vehicle may misbehave on its own due to malfunction or after security attacks. As used herein, "misbehavior" of a vehicle may refer to malicious activities of a vehicle such as, but not limited to, violating traffic laws, ordinances, or regulations; falsifying information; endangering a person or property; etc. A vehicle may submit a misbehavior report (MBR) to the misbehavior authority (MA) at the backend or the infrastructure to report another vehicle having misbehavior at its neighborhood or proximity. After verifying the misbehavior upon receiving misbehavior reports, the misbehavior authority may determine that a misbehaved vehicle shall be included in a certificate revocation list (CRL) to have its certificate revoked. Furthermore, after collecting MBRs and making a decision to revoke a misbehaving participant, e.g., a compromised CA or a malicious vehicle, a distribution center (DC) at the backend may distribute a CRL to the end road users (e.g., vehicles, pedestrians). Since it may be safety-critical to detect and evict malicious road participants from the V2X system, the reporting of misbehavior vehicles and the distribution of CRL are potential important components of a V2X security framework.

However, there are many challenges on the distribution of V2X security certificates, MBR submission and distribution, or CRL distribution, to work reliably and efficiently with low latency. Distribution of security certificates is challenging due to the sheer scale and potential number of participants in need of certificates, e.g., there are hundreds of millions of passenger vehicles in the US today. It is not reasonable to expect every entity to have stored all the certificates for these hundreds of millions of vehicles, plus all the certificates authorities (CA) in the system that issue them. Requesting a missing certificate from the backend may introduce additional latency that may endanger driving safety. In addition, the latency for evicting a misbehaved vehicle may be a long process as well. Due to the intermittent V2X connectivity, when a misbehaved vehicle is detected by a vehicle, the detection vehicle may not always be able to submit the MBR to the MA at the backend in a timely fashion. Hence, MBRs may accumulate at the local buffer of the vehicle, and eventually become obsoleted and are dropped when the buffer is full. Even when the MBR is sent out timely and successfully to the MA at the backend, it is still not a real time process for the MA to investigate and determine the validity of MBR that would eventually lead to the inclusion of the misbehaved vehicle in the CRL. Moreover, due to the scale of the system, a CRL could be very large, resulting in intimidating overhead for CRL and additional latency before all the vehicles receive the most current CRL and finally close the loop on rejecting the messages from a misbehaved vehicle.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 1(a)-1(g) illustrate an example of various entities and their operations in a vehicular communication system, in accordance with some embodiments.

DETAILED DESCRIPTION

Figure 1A:
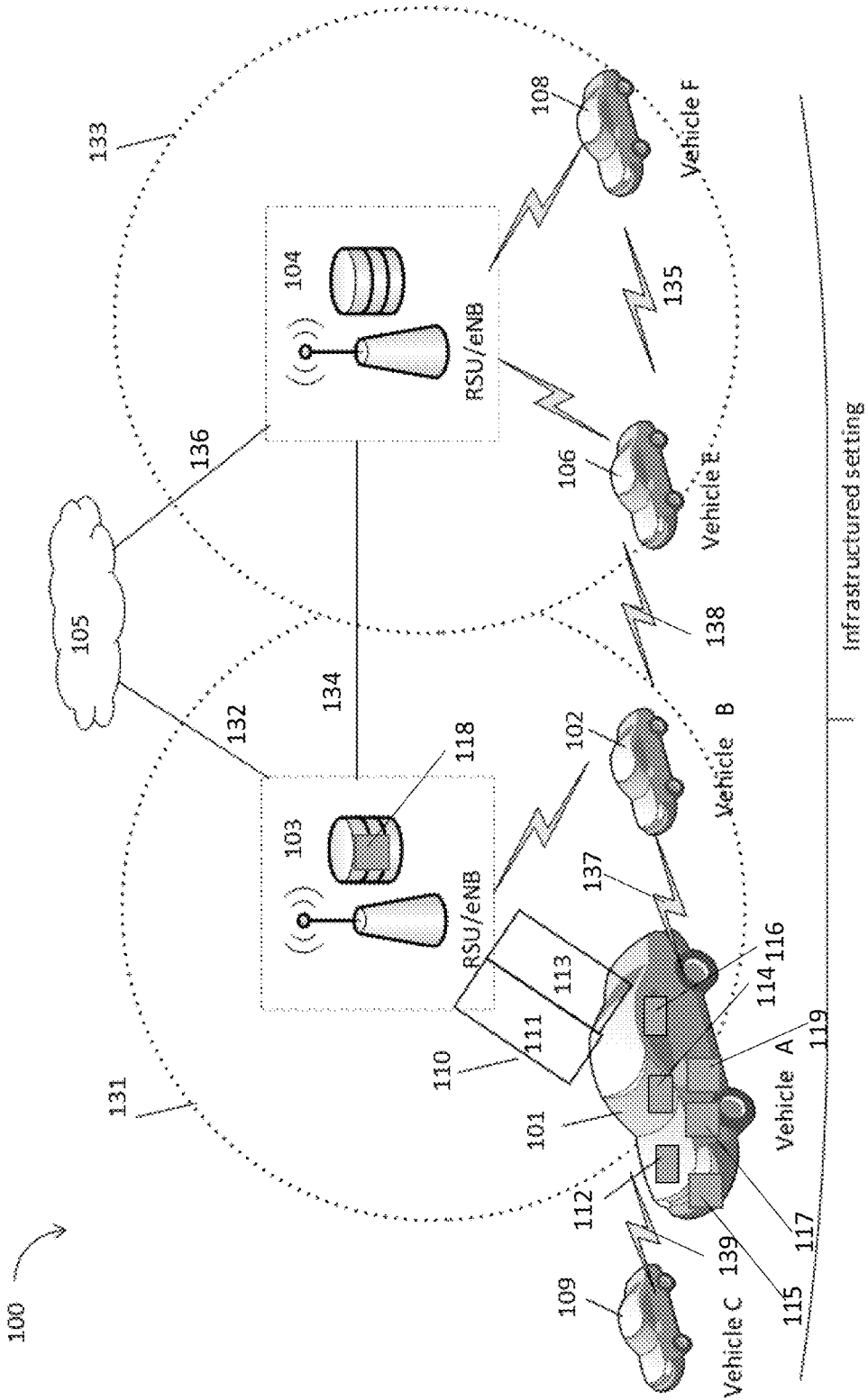
Figure 1B:
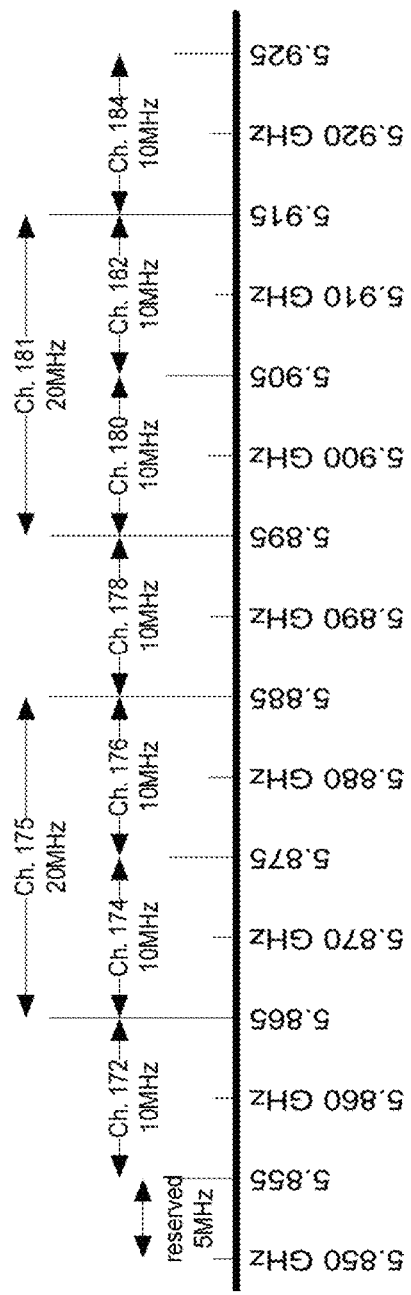

Vehicle-to-everything (V2X) communication is a communication paradigm that enables the information exchange between entities in vehicular environments, e.g., vehicles, roadside units (RSUs), pedestrians and the infrastructure. Communication security is of importance for V2X communication systems. In a V2X security framework, authenticity and integrity of messages exchanged over V2X communication are guaranteed by security signatures, which may be referred to digital signatures. Security certificate is used in the verification of authenticity and integrity of messages exchanged over V2X systems. In addition, misbehavior report (MBR) submission to misbehavior authority (MA) at the backend, MBR distribution to vehicles, certificate revocation list (CRL) distribution to vehicles, are integrated part of a V2X security framework. Current methods for those security management tasks including security certificate distribution, MBR submission, MBR distribution, and CRL distribution may suffer from multiple problems, e.g., long latency for the distribution, channel congestion, risk of denial of service (DoS), reliability of the distribution of the information, and bandwidth efficiency in distribution. For example, a normal process for evicting a misbehavior participant may go from an end user to the backend, e.g., misbehavior reporting, and then from the backend to the end user, e.g., CRL distribution, resulting in a long latency.

Embodiments herein aim to reduce channel congestion and risk of DoS, while improving the bandwidth efficiency and latency for the mission critical services used in V2X communications, e.g., security certificate distribution, MBR submission, MBR distribution, and CRL distribution. Vehicle security data may refer to any of the security certificate, MBR, or CRL. A security certificate may simply be referred to as a certificate. Embodiments may be applicable to any vehicular communication network or system, e.g., a vehicular communication network in the 5.9 GHz dedicated short range communications (DSRC), or cellular vehicle-to-everything (C-V2X), where one or more control channels or one or more service channels may exist. Embodiments herein may offer vehicle security data distribution as a service on devices disposed at an edge of a network, e.g., RSUs or base stations of a cellular network, using one of the service channels. A vehicle may be referenced to as a motored vehicle, a computer-assisted vehicle, or an autonomous vehicle. Embodiments may serve as a complementary mechanism to some existing protocols, e.g., the peer-to-peer certificates distribution (P2PCD) protocol defined in Institute of Electrical and Electronic Engineers (IEEE) 1609.2.

In embodiments, one or more non-transitory, computer-readable media have instructions that, when executed by a computer processor of a device disposed at an edge of a network, causing the device to perform various operations. In detail, the device is caused to generate a list of vehicle security data to be distributed to motored vehicles currently within a coverage area of the device, based at least in part on a context related to the motored vehicles. The device is further caused to announce, on a control channel communicatively coupling the device and the motored vehicles, that the list of vehicle security data are available and a service channel to receive the list of vehicle security data. The list of vehicle security data are to be provided to the motored vehicles via the service channel.

In embodiments, a method of operating a motored vehicle may include receiving an announcement, by the motored vehicle, on a control channel communicatively coupling the motored vehicle with a device disposed at an edge of a network, that a list of vehicle security data are available and a service channel to receive the list of vehicle security data. The motored vehicle is within a coverage area of the device. The method may further include receiving, on the service channel, by the motored vehicle, the list of vehicle security data.

In embodiments, an apparatus to be used in a motored vehicle in a vehicular communication network includes processing circuitry, storage circuitry, and network circuitry coupled with each other. The processing circuitry is to determine a misbehaving motored vehicle based on misbehavior performed by the misbehaving motored vehicle. The storage circuitry is to store an identity of the misbehaving motored vehicle in the storage circuitry. The network circuitry is to transmit a MBR including the identity of the misbehaving motored vehicle. The MBR is transmitted to a server in the vehicular communication network, a RSU, or other motored vehicles communicatively coupled to the motored vehicle.

In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used hereinafter, including the claims, the term "unit," "engine," "module," or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a general purpose processing unit (GPU), a single-core processor, a dual-core processor, a triple-core processor, a quad-core processor, and/or any other device capable of executing or otherwise operating computer-executable instructions, such as program code, software modules, and/or functional processes.

As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. Examples of "computer devices", "computer systems", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management Systems (EEMSs), electronic/engine control units (ECUs), vehicle-embedded computer devices (VECDs), autonomous or semi-autonomous driving vehicle (hereinafter, simply ADV) systems, in-vehicle navigation systems, electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

In general, new radio (NR) will evolve based on $3^{rd}$ Generation Partnership Project (3GPP) LTE-Advanced with additional potential new RATs to enrich people lives with better, simple and seamless wireless connectivity solutions. NR may enable everything connected by wireless and deliver fast, rich contents and services.

Vehicle-to-everything (V2X) communication systems may facilitate the communication from a vehicle to any entity that may affect the vehicle, and vice versa. It is a vehicular communication system that incorporates other more specific types of communication as V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid). There are two types of V2X communication technology depending on the underlying technology being used: WLAN-based, and cellular-based. Many V2X applications (e.g., collision avoidance application, intelligent traffic control signal systems) rely on exchanging driving information (e.g., speed, location, acceleration, and heading) via Basic Safety Messages (BSMs) in the United States or Cooperative Awareness Messages (CAMs) in Europe.

FIGS. 1(a)-1(g) illustrate an example of various entities and their operations in a vehicular communication system 100, in accordance with some embodiments.

In embodiments, the vehicular communication system 100 includes one or more remote servers, e.g., remote servers in a computing cloud 105, one or more devices disposed at an edge of a vehicular communication network, e.g., a device 103 and a device 104, and one or more motored vehicles, or simply vehicles, e.g., a vehicle 101, a vehicle 102, a vehicle 106, a vehicle 108, or a vehicle 109. Various entities, e.g., a vehicle, a device, and a server, may be communicatively coupled by communication links or channels. A communication link or channel may be simply referred to as a link or a channel. For example, the vehicle 101 is coupled to the device 103 through a link 110. In addition, the device 103, the device 104, and the server 105 are coupled by links, e.g., a link 132, a link 134, and a link 136. The device 103 or the device 104 may be stationary, deployed along the road, or at the intersections. There may further be links between vehicles, e.g., a link 135, a link 137, a link 138, and a link 139. In some embodiments, a link shown in FIG. 1(a) may represent multiple links between two entities. Furthermore, a link may include multiple channels. For example, the link 110 includes one or more control channels, e.g., a control channel 111, and one or more service channels, e.g., a service channel 113. A device has a coverage area where the motored vehicles are communicatively coupled to the device through various communication links or channels. For example, the vehicle 101 and the vehicle 102 are within a coverage area 131 of the device 103, while the vehicle 106 and the vehicle 108 are within a coverage area 133 of the device 104.

In embodiments, the device 103 is arranged generate by itself or receive from a server in computing cloud 105, a list 118 of vehicle security data to be distributed to motored vehicles, e.g., the vehicle 101 and the vehicle 102, currently within the coverage area 131 of the device 103, based at least in part on a context related to the motored vehicles. Furthermore, the device 103 is arranged to announce, on the control channel 111 communicatively coupling the device 103 and the motored vehicles, that the list 118 of vehicle security data are available and a service channel, e.g., the service channel 113, to receive the list of vehicle security data. The list 118 of vehicle security data are provided to the motored vehicles via service channels, e.g., the service channel 113 to the vehicle 101.

In addition, a vehicle is arranged to include various hardware and/or software to perform functions together. For example, the vehicle 101 is arranged to include processing circuitry 112, storage circuitry 114, and network circuitry 116 coupled with each other. The network circuitry 116 may include radio transceiver, and other components and circuits, not shown. In embodiments, the vehicle 101, or the network circuitry 106, may receive an announcement 117 on the control channel 111 communicatively coupling the motored vehicle 101 with the device 103. The announcement 117 is to indicate that a list of vehicle security data are available and a service channel to receive the list of vehicle security data. The network circuitry 106 may further receive on the service channel 113 the list 119 of vehicle security data, which is a copy of the list 118 of vehicle security data in the device 103. In addition, in various embodiments, the processing circuitry 112 is to determine a misbehaving motored vehicle, e.g., the vehicle 109, based on misbehavior performed by the misbehaving motored vehicle. The storage circuitry 114 is to store an identity 115 of the misbehaving motored vehicle in the storage circuitry, and the processing circuitry 112 is further to continue monitor the misbehaving motored vehicle 109 to collect more information with respect to the misbehavior performed by the misbehaving motored vehicle 109. Furthermore, the network circuitry 116 to transmit a MBR including the identity 115 of the misbehaving motored vehicle, where the MBR is transmitted to the server 105, the device 103, or other motored vehicles, e.g., the vehicle 102, communicatively coupled to the motored vehicle. In addition, the MBR further includes evidence that attests to the misbehavior of the misbehaving motored vehicle 109. In detail, the network circuitry 116 may transmit the MBR by broadcasting to local neighbors of the vehicle 101 who are relevant to the misbehavior performed by the misbehaving motored vehicle. In some embodiments, the network circuitry 116 is further to receive another MBR from the device 103 or from other motored vehicles, e.g., the vehicle 102. The processing circuitry 112 is to validate the second MBR at least based on sensor information local to the motored vehicle, and the storage circuitry 114 is to store the second MBR.

In embodiments, the server in computing cloud 105 may be a part of a public key infrastructure (PKI) or CA to distribute V2X security certificates, a MA to manage MBRs, a DC to manage CRLs, a database server, or any other server. For example, the server 105 may be a PKI used in IEEE 1609.2, which is adopted by the SCMS for establish trust among communicating entities (vehicles, RSUs, etc.).

The server in computing cloud 105 may be a server of multiple servers located at the backend or a part of an infrastructure.

In embodiments, channels of a link may be of a same communication technology, or of different communication technologies. Similarly, links may be of a same communication technology or of different communication technologies. For example, the vehicular communication system 100 may include links or channels in the 5.9 GHz dedicated short-range communications (DSRC) technology, or cellular vehicle-to-everything (C-V2X) technology. For example, the link 132, the link 134, and the link 136 may include secure out-of-band channels, e.g., a secure tunnel over the Internet, between the device 103, the device 104, and the server 105. The device 103 may be a RSU in DSRC or a based station, e.g. an eNB or a gNB, in 5G or LTE technology. In the context of LTE or 5G, an eNB or a gNB plays similar roles as the RSU in DSRC. In embodiments, an eNB, a gNB, or a RSU are interchangeable to a device disposed at an edge of a vehicular communication network.

In embodiments, vehicles, e.g., the vehicle 101, the vehicle 102, the vehicle 106, the vehicle 108, and the vehicle 109, may perform vehicle-to-vehicle (V2V) communications to exchange messages, e.g., basic safety messages (BSMs). The message exchanged may be based on various communication standards, e.g., the IEEE Wireless Access in Vehicular Environments (WAVE). WAVE is also known as a DSRC standard used for vehicular communications. Within the WAVE standard, IEEE 1609.2 is a standard that further defines security services for applications and message management. Various entities, e.g., the vehicle 101, the device 103, and the server 105, may perform some operations according to the WAVE or IEEE 1609.2 standard, while performing additional operations following additional protocols presented in the current disclosure. The WAVE or IEEE 1609.2 is used as an example to show how the current embodiments work with some existing standards. Other current standards, e.g., C-V2X, may work with the embodiments in ways similar to the WAVE or IEEE 1609.2 standard.

Based on the WAVE standard, the 5.9 GHz band assigned to DSRC is divided into seven channels as shown in FIG. 1(*b*). In embodiments, the communication link 110, the control channel 111, and the service channel 113, may be in the 5.9 GHz band assigned to DSRC. As shown in FIG. 1(*b*), FCC has allocated the 75 MHz spectrum in the 5.9 GHz band (from 5.850 GHz to 5.925 GHz) for DSRC operations. The 75 MHz spectrum is divided into seven 10 MHz channels with a 5-MHz guard band at the low end. Channel 178 (10 MHz) is the control channel (CCH), which may be the control channel 111, while other channels are service channels (SCH), e.g., the service channel 113. In addition, the 5.9 GHz band may not be limited to DSRC operations, and C-V2X technology may also be used in the 5.9 GHz band. For example, different countries may use different spectrum for the link 110, which can be divided into the control channel 111 and the service channel 113. The control channel 111 may be a control channel of C-V2X standard at 5.9 Ghz band or other band C-V2X operates on, and the service channel 113 may be a non-critical service channel of the C-V2X standard at 5.9 Ghz band or other band C-V2X operates on.

| Country | Spectrum (MHz) | Allocated bandwidth (MHz) |
| --- | --- | --- |
| Australia | 5855-5925 | 70 |
| China | 5905-5925 (trials) | 20 |

-continued

| Country | Spectrum (MHz) | Allocated bandwidth (MHz) |
| --- | --- | --- |
| Europe | 5875-5905 | 30 |
| Japan | 755.5-764.5 and 5770-5850 | 9 and 80 |
| Korea | 5855-5925 | 70 |
| Singapore | 5875-5925 | 50 |
| USA | 5850-5925 | 75 |

In addition, messages may be divided into different priorities classes to be sent on CCH or SCH based on their priority classes. The control channel CCH is reserved for WAVE short message protocol (WSMP) messages and system management messages such as WAVE service advertisement (WSA). Safety critical application messages that require immediate actions may also be sent on the CCH. On the other hand, a SCH is intended for general-purpose application data. For the multiple SCHs, some SCH may carry messages with higher priority. For example, some SCHs may be critical SCHs for carrying messages with higher priority, and some other SCHs may be non-critical SCHs for carrying messages with lower priority. In embodiments, one or more non-critical SCHs may be used to carry the list 118 of vehicle security data, which is different from the IEEE 1609.2 standard or the WAVE standard. A vehicle may switch to the CCH on a regular basis to receive control information. When a vehicle has two or more radios, the vehicle may have one radio to communicate on the CCH and the other radio tunes to SCHs.

IEEE 1609.2 constitutes a generic security layer for messages exchanged through V2X. Similar ideas may be reused in cellular based C-V2X technologies such as LTE or 5G, as being considered by 5G Automotive Association (SGAA). IEEE 1609.2 provides mechanisms for message authenticity and integrity verifications, based on certificates and a PKI to establish trust among communicating entities (vehicles, RSUs, etc.). In some detail, digital signatures are used to provide message integrity. A message receiver can use the signing certificate, and its associated certificate chain, to validate the authenticity of the message. In order to improve communication efficiency, IEEE 1609.2 does not mandate the inclusion of the whole certificate chain inside signed messages. Instead, a signed message may only carry the signing certificate, or a partial certificate chain. As a consequence, the receiver of a signed message may not be able to immediately re-construct the complete certificate chain associated to the signed message. As a consequence, a mechanism to retrieve or distribute the missing certificates is needed. Sometimes, certificates may be made available to receivers through an out-of-band channel. Some current implementations may proactively use pre-installing CA certificates inside the vehicle to anticipate its future needs, or allow the message receiver to dynamically fetch missing certificates when needed.

The dynamic nature of V2X scenarios, the strict latency requirements of safety critical applications, and the potentially large space of CAs, make certificates distribution particularly challenging in V2X. Channel congestion may be a problem for CCH, which may cause concerns for many applications, e.g., safety applications. The IEEE 1609.2 standard presents the peer-to-peer certificate distribution (P2PCD) protocol to address some of V2V level congestion issues. P2PCD allows the receiver of a signed message to reactively request and fetch the missing CA certificates from its local neighboring vehicles.

However, P2PCD still suffers from latency, reliability and efficiency issues. In general, a receiver may not be able to validate the signature of an incoming message when the receiver does not recognize the issuer of the topmost certificate provided within the signed message. The P2PCD protocol allows such a receiver to request "on-the-fly" the missing certificate from its local peers, e.g., vehicles in its transmission range.

Figure 1C:
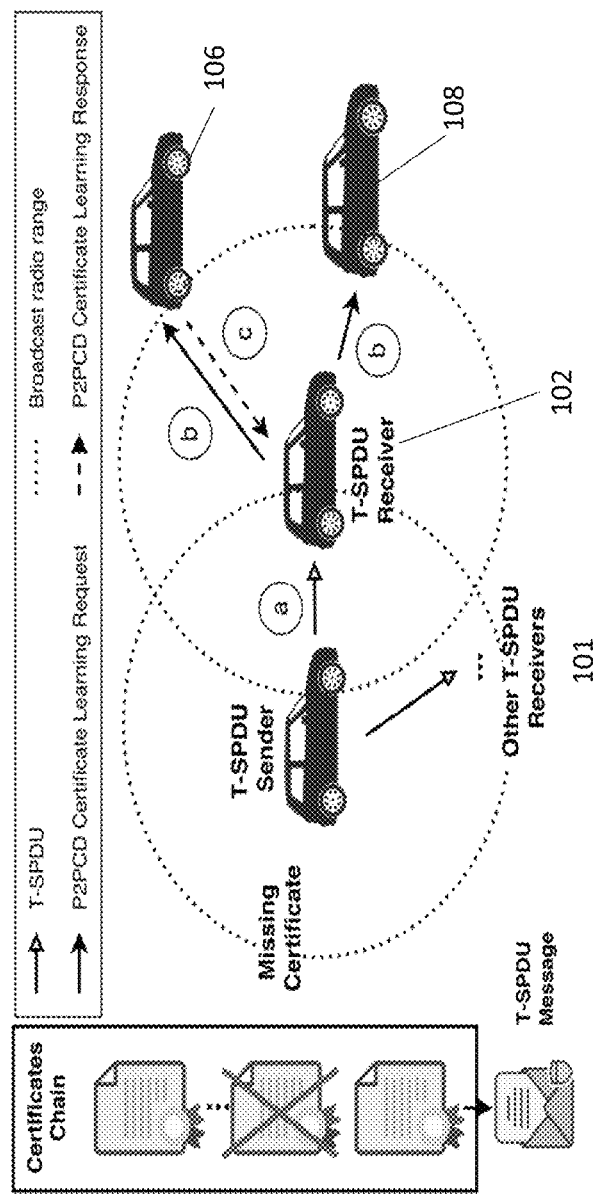

FIG. 1(c) illustrates a high-level message flow of the P2PCD protocol. The message flow includes: (1) a sender, e.g., the vehicle 101, sends a signed message (message ⓐ), which becomes the trigger of the P2PCD procedure; (2) a receiver, e.g., the vehicle 102, is unable to validate the signature of the signed message due to missing a necessary certificate, and hence broadcasts a Certificate Learning Request (message ⓑ) asking for the missing certificate to vehicles in the neighborhood of the receiver, e.g., the vehicle 106, the vehicle 108; (3) responders, e.g., the vehicle 106, who receives the Learning Request, broadcast the certificate in request (message ⓒ) if they have it on their own certificate chain.

During the message flow of the P2PCD protocol, a large number of messages may be communicated in the broadcasts. Hence, the P2PCD protocol may still not able to achieve the efficiency and reliability of retrieving CA certificates with low latency while at the same time limit the risk of flooding the channel, especially in a highly dynamic vehicular environment, as shown below in FIG. 1(d).

Figure 1D:
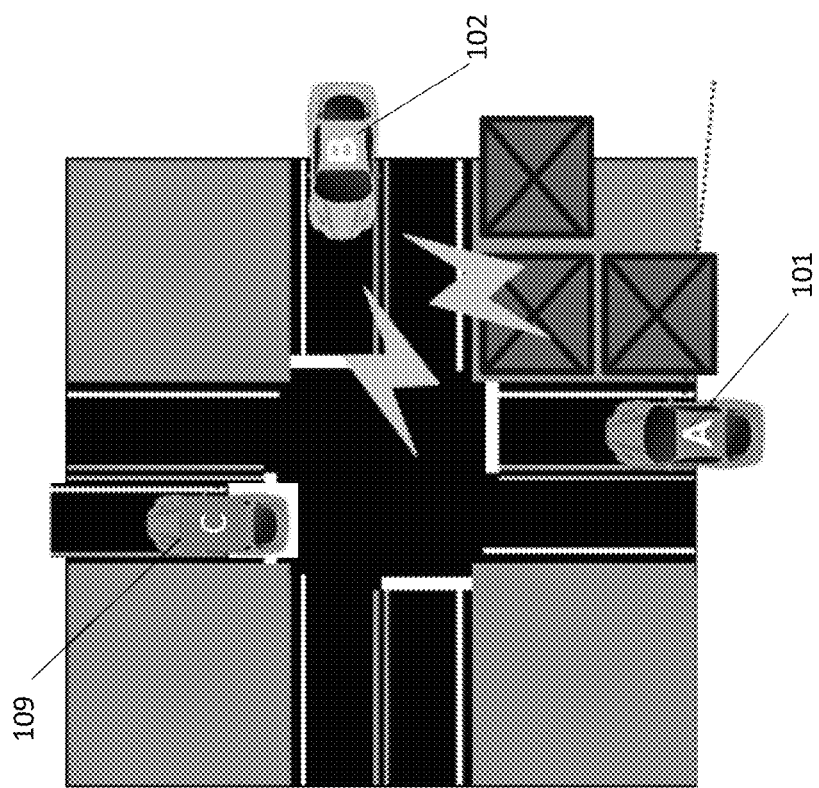

FIG. 1(d) shows message communication between, the vehicle 101, the vehicle 102, and the vehicle 109. To avoid collision, the vehicle 101 and the vehicle 102 exchange BSMs every 100 ms to communicate critical driving status, e.g., the current position, yaw rate, speed and acceleration of the vehicle. Based on the BSMs communicated, the vehicle 101 and the vehicle 102 may make intelligent predictions to alert the drivers of the danger if imminent crash is foreseen. The vehicle 101 may receive BSM messages from the vehicle 102 that indicate the vehicle 102 is approaching to the intersection, while the vehicle 101 is obstructed from seeing the vehicle 102 by obstacles at the corner of the intersection. The vehicle 101 may validate the BSM messages (including signatures) from the vehicle 102 in a short time frame, as it needs to take immediate actions to prevent potential collision. If the vehicle 101 does not have the complete certificate chain of the vehicle 102 for signature verification, the vehicle 101 may launch P2PCD as specified by IEEE 1609.2 to request the missing certificate from the vehicle 109 at its neighborhood. The exchange between the vehicle 101 and the vehicle 109 may include a round of message exchange that introduces delay in order to reduce channel flooding risks. Therefore, the P2PCD protocol may not be completed successfully in short time, endangering driving safety.

As shown in FIG. 1(d), the success of the P2PCD protocol relies on the neighboring vehicles, e.g., the vehicle 109. If neighbors do not have the certificate chain in request, the requester may not be able to reconstruct the certificate chain, resulting in failing to verify safety-critical messages. Thus, P2PCD is at most a best-effort approach, but not a reliable way to fetch CA certificates. In addition, when vehicles on the road do not know each other and do not share same certificate chains, each of them needs to perform P2PCD protocol individually for each unknown CA certificate chain, which consumes precious bandwidth resources and adds huge burden on the channel resulting in channel congestion. Furthermore, P2PCD does not mandate which channel it should operate on. Some deployment considerations suggest in general to use the same channel as being used for secured protocol data units (SPDUs) that triggers the P2PCD process. In the dynamic vehicular environment where new certificate chains are introduced, the more crowded the channel is, the more likely P2PCD will be launched. Therefore, the performance of P2PCD exacerbates on the busy channel such as the CCH, resulting in channel congestion. This impacts safety-critical applications as well as the robustness of the vehicular communication system. Therefore, it will be advantageous to havea low-latency enhancement to improve the efficiency and resilience for distributing CA certificates that are needed yet missing for the signature verification of the V2X messages.

Some alternative mechanism to the P2PCD protocol may use a RSU-based certificate distribution approach, as a complementary solution to the P2PCD protocol for efficiency and resilience enhancements. In such an alternative mechanism, a RSU, when available, is to handle the certificate provisioning within a neighborhood by proactive provisioning of "potentially missing" CA certificates in its coverage area, e.g., certificates that vehicles might not have, but may need for signature verification. However, such a RSU-based scheme does not provide the mechanism to distribute the CA certificates that are needed by the vehicles in the RSU's coverage. Especially, it does not have the details on which channel the RSU broadcasts those CA certificates. Instead, the RSU is supposed to broadcast the CA certificate list directly on the CCH. Even though such a RSU based mechanism reduces the overhead and improves efficiency comparing to the P2PCD protocol, it still introduces nontrivial burden on the CCH.

In order to reduce the overhead introduced to the busy and critical channel (e.g., control channel CCH), embodiments herein present certificate distribution as a service, different from the proactive provisioning of "potentially missing" CA certificates in its coverage area. In embodiments, the certificate distribution may start by a RSU to announce a service on the control channel using WSA, which provides a CA certificate dissemination service for vehicles in its coverage. By positioning the CA certificates retrieval as a service, the overhead introduced to the critical and busy channel, e.g., the control channel CCH, may be significantly reduced. Instead of having potentially a large number of large messages (due to the large size of certificates) broadcasted on the control channel, embodiments herein may have a much smaller overhead for the control channel to announce the service. For example, in embodiments, the overhead for the announcement of the service can be as low as one periodic WSA with minimum frame length 69 bytes. Note that in DSRC, the size of a certificate is about 120~160 bytes. Furthermore, embodiments herein may have low latency, which is important for safety-critical applications.

Figure 1E:
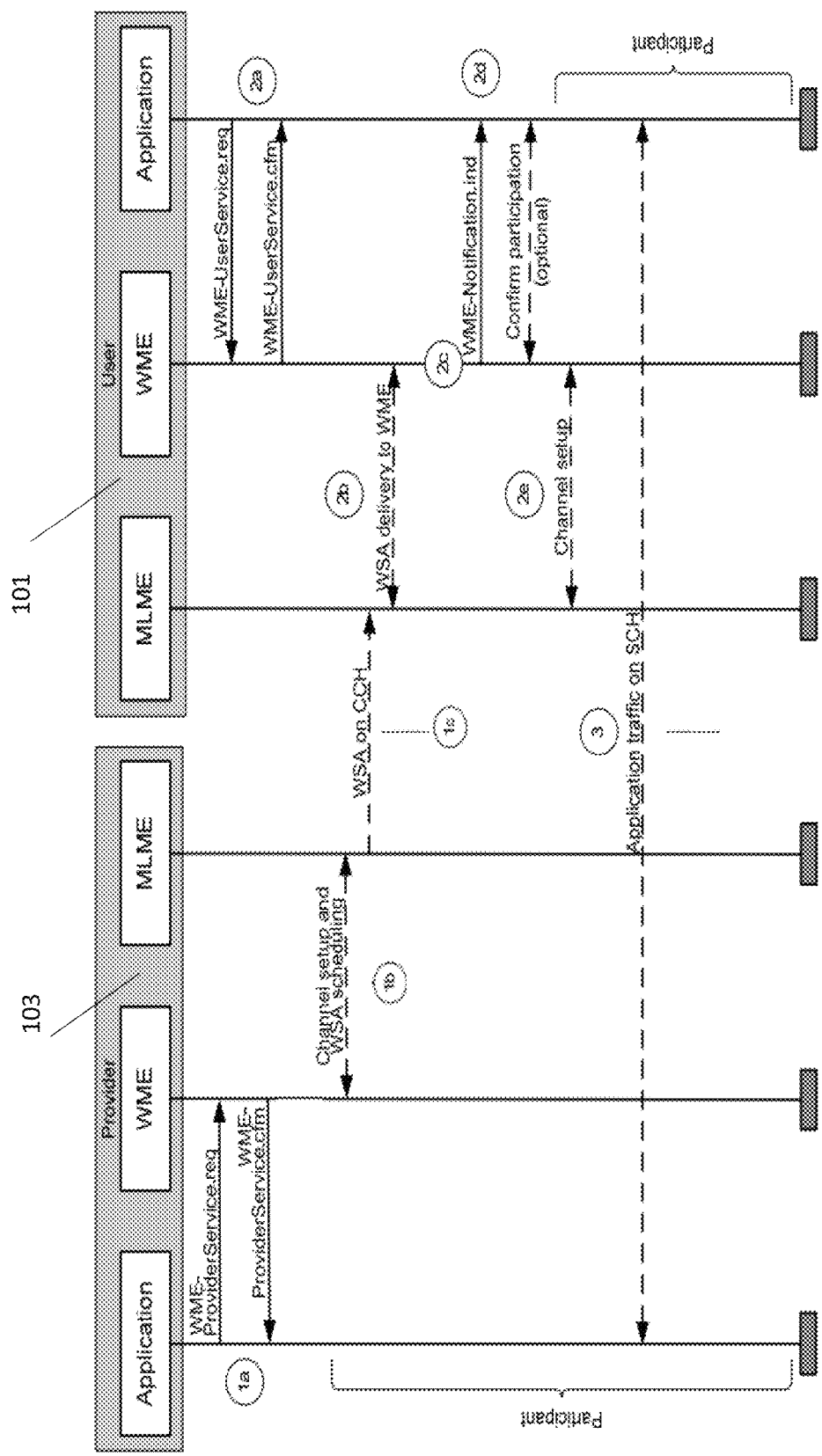

FIG. 1(e) illustrates some details of the advertised service opportunities are announced on the air interface via a WSA inside an IEEE 802.11 management framework. In the context of an advertised service opportunity, a WAVE device may take on one of two roles, Provider or User. A Provider, e.g., the device 103, transmits the WSA containing information about the advertised service with frequency from 5 transmissions per 100 ms to 1 per 5 seconds. The User, e.g., the vehicle 101, monitors for the WSA, with the potential to participate in the advertised service opportunity.

In some details, the device 103 may be a provider and the vehicle 101 may be a user. Both the device 103 and the vehicle 101 include Management Entity (WME) that interacts with the MAC sublayer management entity (MLME) to coordinate the correct SCH access and the periodic transmission of the WSA on the CCH. As shown in FIG. 1(e), at interaction 1a or interaction 2a, the application interacts with WME to setup the device 103 and the vehicle 101 as a provider or a user, respectively. The setup in interaction 1a or 2a may include to setup Provider Service Identifier (PSID) to be advertised, the service priority, the advertisement repetition rate, and the SCH to use. At interaction 1b, WME may interact with MLME to setup the CCH and schedule the WSA to send the information about the advertise service priority, the advertisement repetition rate, and the SCH to use. At interaction 1c, the device 103 may send the advertisement to the vehicle 101. At interaction 2b, the MLME of the vehicle 101 may receive the WSA on the CCH and send to WME of the vehicle 101. At interaction 2c and interaction 2d, the vehicle 101 may notify and confirm its participation in the service. At interaction 2e, the vehicle 101 may setup the service channel to receive the list of vehicle security data. Furthermore, at interaction 3, the device 103 and the vehicle 101 may communicate to distribute the list of vehicle security data.

As a result of the advertisement, vehicles are aware of this service when they listen to the rendezvous control channel CCH. The RSU provides the CA certificate dissemination service on the service channel specified by the WSA by compiling and broadcasting "potentially missing" CA certificates selected based on the context. Vehicles switch to this service channel to fetch the needed CA certificates, when they fail to verify the signature of a received message due to being unable to construct the certificate chain. Moreover, vehicles may tune to this service channel, on a regular basis or whenever they are idle, to pre-fetch CA certificates that they might need later.

Embodiments herein may further present a mechanism to compose the certificate list to be broadcasted and adapt the distribution frequency, based on contextual parameters (e.g., channel status, the number of vehicles needing the CA certificate), to reduce the communication overhead associated with certificate provisioning.

FIGS. 1(f)-1(g) illustrate example processes of operations performed by a device or a vehicle in a vehicular communication system 100, in accordance with some embodiments. In detail, FIG. 1(f) presents a process 150 to be performed by a RSU or a base station of a cellular network, e.g., the device 103 or the device 104 of FIG. 1(a), and FIG. 1(g) presents a process 160 to be performed by a vehicle, e.g., the vehicle 101 of FIG. 1(a).

At a block 151, the process 150 may include generating a list of vehicle security data to be distributed to motored vehicles currently within a coverage area of the device, based at least in part on a context related to the motored vehicles. For example, as shown in FIG. 1(a), the device 103 generates the list 118 of vehicle security data to be distributed to motored vehicles, e.g., the vehicle 101 and the vehicle 102, currently within the coverage area 131 of the device 103. The list 118 of vehicle security data is generated based at least in part on a context related to the motored vehicles. The list 118 of vehicle security data may include a list of security certificates for verifying authenticity or integrity of messages sent or received by the motored vehicles, a CRL including identities of vehicles whose security certificates are to be revoked, or a MBR including identities of one or more misbehaving motored vehicles. In some embodiments, the device 103 may monitor communication messages within the coverage area 131 through the device 103, and identify the motored vehicles currently within the coverage area 131 based on the monitored communication messages. The list 118 of vehicle security data may be generated based on the motored vehicles currently within the coverage area, messages within the coverage area through the device, and information from the server 105. In some embodiments, the device 103 may further receive information from the server 105, or one of the motored vehicles, and generate the list 118 of vehicle security data at least partially based on the received information.

In some embodiments, the list 118 of vehicle security data includes a list of security certificates for verifying authenticity or integrity of messages sent or received by the motored vehicles, and the list 118 of security certificates are collected by the device 103 from message signatures being verified by the device 103. The security certificates may include an intermediate certificate, a root certificate, an elector certificate, or an endorsement.

In some embodiments, the list 118 of vehicle security data includes a CRL including identities of vehicles whose security certificates are to be revoked, and the CRL is obtained by customizing a global CRL with respect to the motored vehicles. The global CRL may be received by the device 103 from the server 105. In some embodiments, the CRL is received from the server 105, where the CRL is generated by the server 105 by customizing a global CRL with respect to motored vehicles currently within the coverage area 131 of the device 103.

In some embodiments, the list 118 of vehicle security data includes a MBR including identities of one or more misbehaving motored vehicles. An identity of a misbehaving motored vehicle is included in the MBR when a report on misbehavior of the misbehaving motored vehicle has been received from another motored vehicle, and the misbehaving vehicle is within the coverage area of the device or will be within the coverage area based on a prediction according to a trajectory of the misbehaving vehicle.

At a block 153, the process 150 may include announcing, on a control channel communicatively coupling the device and the motored vehicles, that the list of vehicle security data are available and a service channel to receive the list of vehicle security data. The list of vehicle security data are provided to the motored vehicles via the service channel. In some embodiments, the device may broadcast on the control channel that the list of vehicle security data are available. For example, as shown in FIG. 1(a), the device 103 is to announce, on the control channel 111, that the list 118 of vehicle security data are available and the service channel 113 to receive the list 118 of vehicle security data. The list 118 of vehicle security data are provided to the motored vehicles via the service channel 113. The device 103, e.g., a RSU or a base station, may broadcast on the control channel 113 that the list 118 of vehicle security data are available.

Figure 2A:
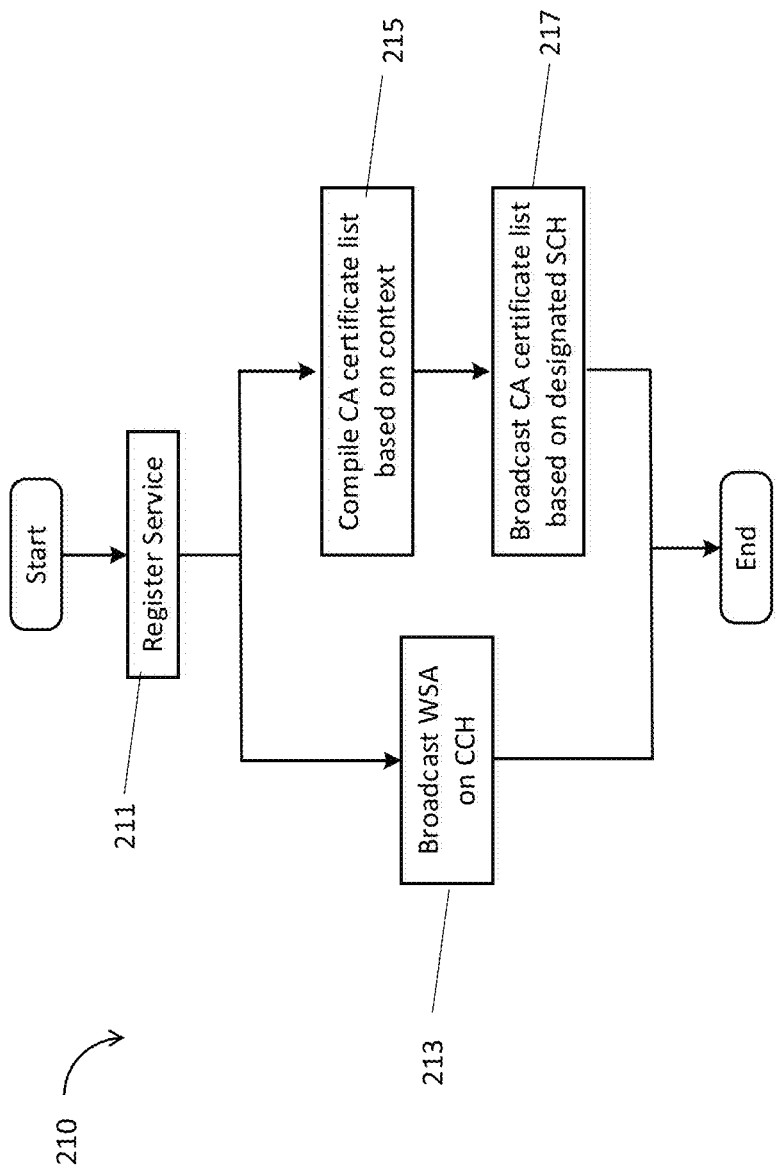
FIGS. 2(a)-2(b) illustrate example processes to be performed by various entities for distributing security certificates in a vehicular communication system, in accordance with some embodiments.
Figure 2B:
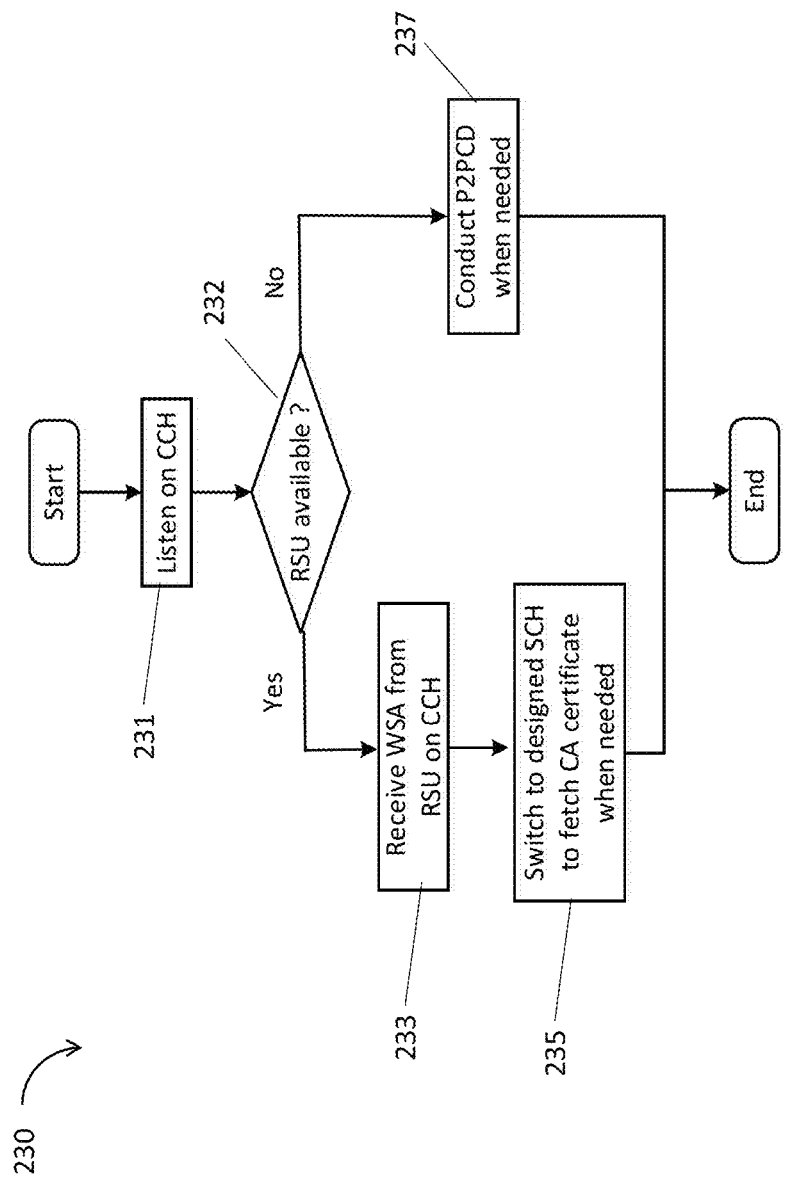
Figure 3A:
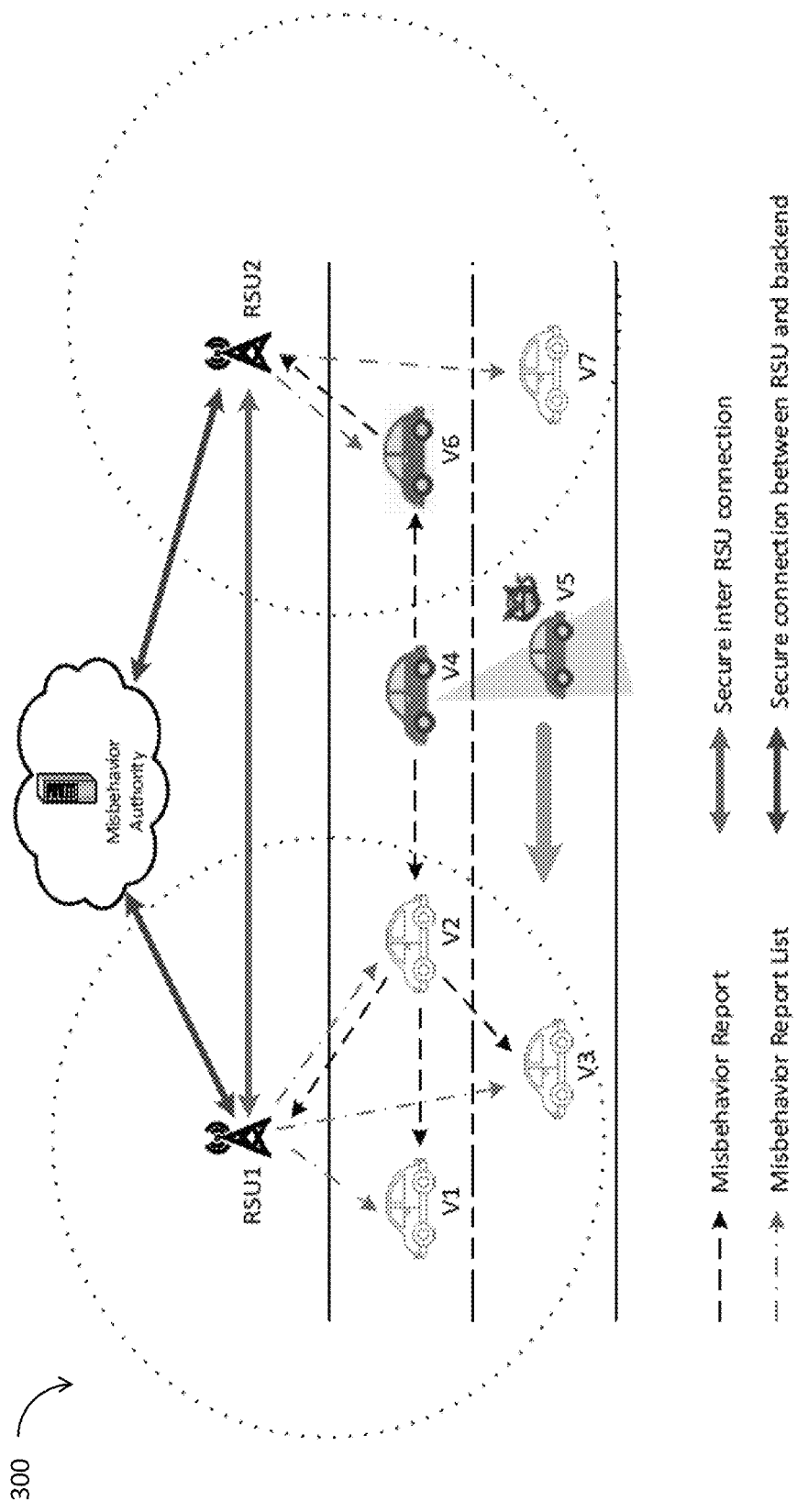
FIGS. 3(a)-3(b) illustrate example processes to be performed by various entities for distributing misbehavior reports (MBRs) in a vehicular communication system, in accordance with some embodiments.
Figure 3B:
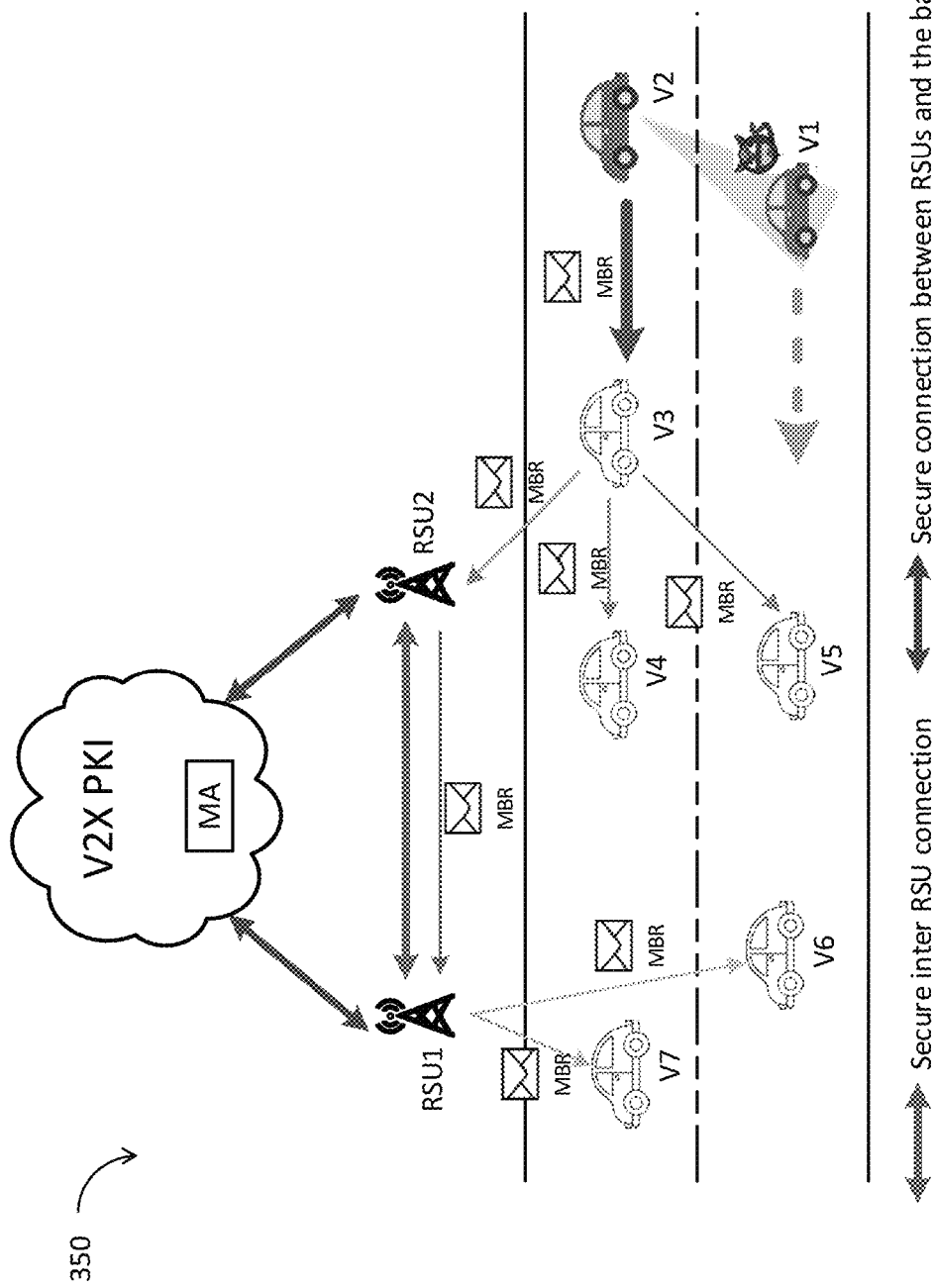
Figure 4:
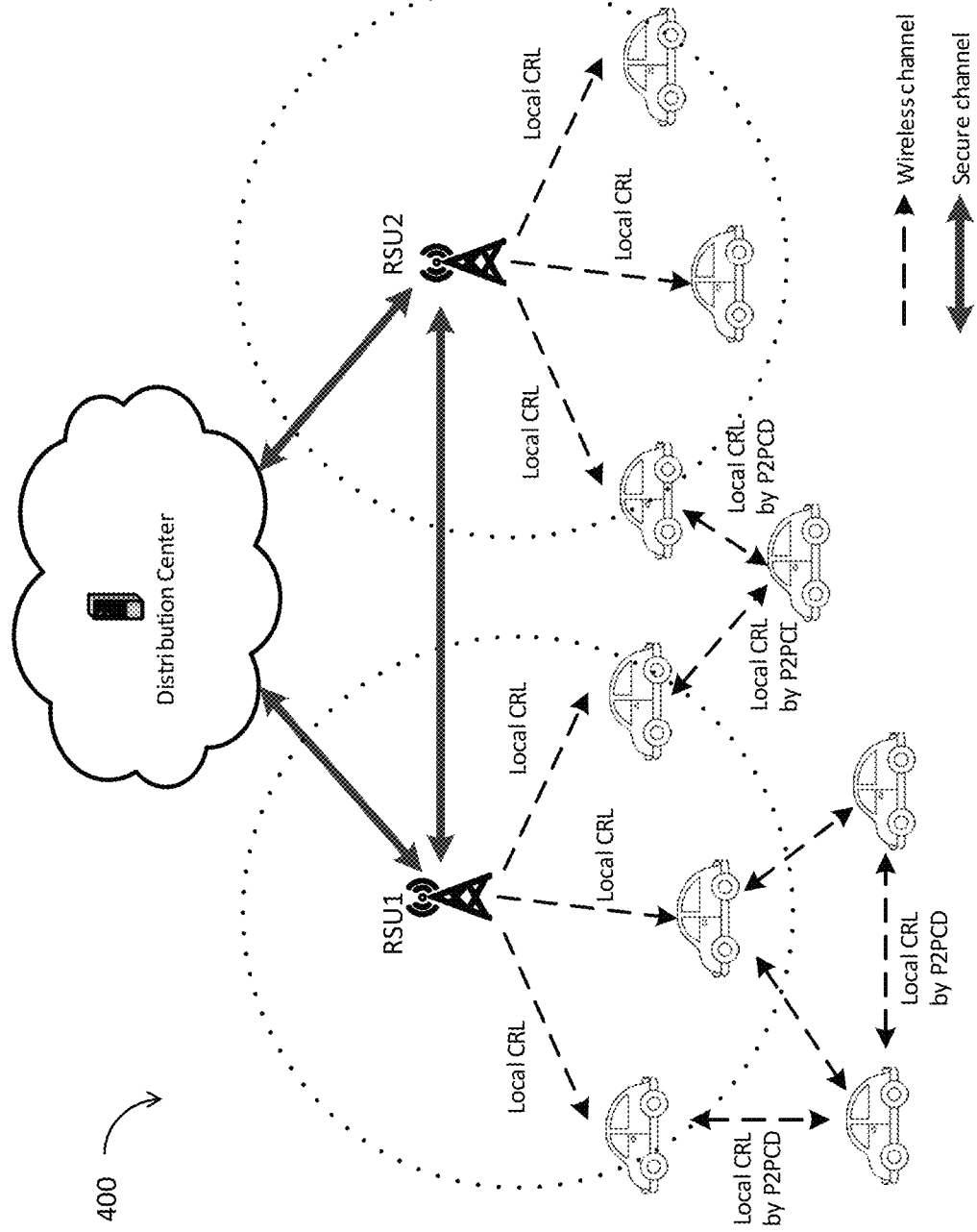
FIG. 4 illustrates an example process to be performed by various entities for distributing a certificate revocation list (CRL) in a vehicular communication system, in accordance with some embodiments.

At a block 155, the process 150 may include distributing the list of vehicle security data to the motored vehicles via the service channel. For example, as shown in FIG. 1(a), the device 103 is to distribute the list 118 of vehicle security data to the motored vehicles via the service channel 113, which may be received by the vehicle 101 to be saved as the list 119 on the vehicle 101. In some embodiments, the list 118 may be distributed by broadcasting on the service channel 113. The list 118 of vehicle security data may be distributed to the motored vehicles accordingly to a frequency adjustable according to one or more factors of a context of the device, and where the one or more factors includes a tolerance level for misbehavior vehicles, a size of a global CRL, a size of a localized CRL, a channel status, or a difference between a CRL at a first time instance and a CRL at a second time instance. FIGS. 2(a)-2(b) present more details on distributing the list 118 of security certificates for verifying authenticity or integrity of messages sent or received by the motored vehicles. FIGS. 3(a)-3(b) present more details on distributing the list 118 as a MBR including identities of one or more misbehaving motored vehicles. FIG. 4 presents more details on distributing a CRL including identities of vehicles whose security certificates are to be revoked.

In embodiments, the vehicle 101 may perform the process 160 including operations in correspondence with the process 150 for the device 103.

At a block 161, the process 160 may include receiving an announcement, by the motored vehicle, on a control channel communicatively coupling the motored vehicle with a device disposed at an edge of a network, that a list of vehicle security data are available and a service channel to receive the list of vehicle security data. The motored vehicle is within a coverage area of the device. For example, as shown in FIG. 1(a), the vehicle 101 may receive an announcement, on the control channel 111 communicatively coupling the vehicle 101 with the device 103, that the list 118 of vehicle security data are available and the service channel 113 to receive the list 118 of vehicle security data.

At a block 163, the process 160 may include receiving, on the service channel, by the motored vehicle, the list of vehicle security data. For example, as shown in FIG. 1(a), the vehicle 101 may receive, on the service channel 113, the list 118 of vehicle security data.

In addition, the vehicle 101 may further determine another vehicle has misbehaved, and send a MBR including an identity of the other motored vehicle to the device. The MBR further includes evidence that attests to the misbehavior of the other motored vehicle. The vehicle 101 may broadcasting the MBR to other motored vehicles.

FIGS. 2(a)-2(b) illustrate example processes to be performed by various entities for distributing security certificates in a vehicular communication system, in accordance with some embodiments. In embodiments, a RSU or a base station may perform a process 210 as shown in FIG. 2(a), while a vehicle may perform a process 230 as shown in FIG. 2(b). The process 210 may be a more detailed example of the process 150, while the process 230 may be a more detailed example of the process 160.

In order to mitigate channel congestion on CCH and critical SCHs and provide efficient CA certificate distribution, embodiments herein present a service-oriented certificate distribution that the RSU disseminates CA certificates actively in terms of a certificate service on one of the non-reserved service channel.

RSU operations

The RSU plays the role of Provider, who registers a certificate service and provides a context-based CA certificate dissemination to vehicles at its coverage area. Specifically, the RSU performs the following operations, as shown in FIG. 2(a). The RSU may be an example of the device 103 shown in FIG. 1(a).

At a block 211, the process 210 includes service registration. The RSU first registers the CA certificate distribution service at the Registration Authority by sending a Provider Service request. The request indicates the characteristics of the services, such as the Provider Service Identifier (PSID) to be advertised, the service priority, the advertisement repetition rate, and the SCH to use. Note that the requested SCH for the service may be a non-critical SCH, which is not reserved for safety-critical applications and is not as busy as a safety-critical SCH or CCH.

At a block 213, the process 210 includes service announcement on CCH. If the service registration is approved, the RSU proceeds to announce this service on CCH via periodic WSAs. The service parameters are included in one of a variable number of service info segments in the WSA. For example, channel parameters are included in one of a variable number of Channel Info segments. The WSA may be signed using the security processing services. The WAVE Management Entity (WME) may also interact with the MAC sublayer management entity (MLME) to coordinate the correct SCH access and the periodic transmission of the WSA on the CCH.

At a block 215, the process 210 includes compiling CA certificate list based on context. In detail, the RSU monitors the DSRC messages and verifies their signatures. Consequently, during the signature verification, the RSU collects CA certificates used by the vehicles in its coverage. If it sees a CA certificate that are needed by many vehicles, the RSU may fetch it from the PKI (if the RSU does not have it already) and add it to the certificate list.

At a block 217, the process 210 includes broadcasting CA certificate list based on designated SCH. The complied CA certificate list may be broadcasted by the RSU as a service on the designated SCH continually or periodically.

Vehicle Operations

A vehicle in the RSU's coverage plays the role of User, who obtains the service information from the WSAs of the certificate distribution service on CCH and tunes to the designated SCH to use the service. Specifically, a vehicle in the service coverage performs the following operations, as shown in FIG. 2(b). The vehicle may be an example of the vehicle 101 shown in FIG. 1(a).

At a block 231, the process 230 includes listening on CCH. At a block 232, the process 230 includes determining a RSU is available or not. At a block 233, the process 230 includes receiving service advertisement on CCH. If a vehicle has only one DSRC radio, it may tune to the CCH at a regular basis to receive system management messages and WSAs, and then at a block 235, the process 230 includes switching to SCHs that provide services the vehicle has interests. If a vehicle has two or more radios, it may have one radio listen on the CCH and others work on SCHs. The vehicle obtains the service information (e.g., PSID, SCH to use, service priority) of the certificate dissemination service provided from the corresponding WSAs broadcasted by the RSU on CCH.

The vehicle continues to normal vehicular communications, e.g., receiving signed messages and verifying signatures. When it fails to re-construct the certificate chain while verifying a signature, it tunes to the designated SCH and listens to the CA certificates broadcasted by the RSU. Alternatively, to reduce further the latency of fetching CA certificates that are potentially needed, the vehicle may actively tune to this service channel on a regular basis or whenever they are idle. When it sees a CA certificate new to itself, it keeps a local copy as it is very likely to meet a "stranger" vehicle with this CA certificate on its chain in the local neighborhood. When the vehicle receives messages from the "stranger" vehicle, it has already pre-fetched the needed CA certificate and therefore is able to verify immediately the signatures without any delay.

In some embodiments, if the vehicle pre-fetches and stores CA certificates from the certificate distribution service, it may want to clean up those CA certificates that it unlikely needs in the future for storage saving purpose. As a guideline, CA certificates to be removed from local storage may not be on the certificate broadcast list from the RSU and should have not been used for signature verification for a long time.

Fallback solution—If the certificate needed by a vehicle is not broadcasted by the RSU, the vehicle is allowed to send a request directly to the RSU for fetching the missing CA certificate. The RSU will fetch the CA certificate from the PKI and then add it to the broadcast list.

Furthermore, embodiments herein are complementary to P2PCD. At a block 237, when the RSU is not available (e.g., either no RSU or the RSU is passive), the process 230 includes using P2PCD protocol for retrieving the missing certificates from other vehicles in the neighborhood.

Advantages—Embodiments herein may have the following advantages.

Reliability: the RSU monitors the traffic and has the computational capability to verify all the signatures. Therefore, it is able to identify all the CA certificates used and potentially needed by the neighborhood. Then, those potentially needed yet missing certificates are fetched from the PKI by the RSU as it has reliable communication channel with the PKI. As a result, the RSU may provide CA certificates in a more reliable way than P2PCD, which is purely by chance relying on peer neighbors having the certificates in request.

Efficiency: comparing to P2PCD's ad hoc fashion, in embodiments, the certificates are disseminated in a centralized fashion managed by the RSU so as to reduce the overhead — not just the overall overhead, but more importantly, the overhead added to the control channel. The minimum WSA frame length is only 69 bytes, while the size of a DSRC certificate is typically 120~160 bytes and the certificate list may contain multiple CA certificates. Therefore, moving the actual delivery of CA certificates from the CCH to a SCH at the cost of a WSA reduces channel congestions on the CCH significantly.

FIGS. 3(a)-3(b) illustrate example processes to be performed by various entities for distributing misbehavior reports (MBRs) in a vehicular communication system, in accordance with some embodiments. In embodiments, a vehicular communication system 300 shown in FIG. 3(a) and a vehicular communication system 350 shown in FIG. 3(b) are examples of the vehicular communication system 100 shown in FIG. 1(a). In detail, the vehicular communication system 300 or the vehicular communication system 350 includes RSU1, RSU2, and Misbehavior Authority (MA), which are examples of the device 103, the device 104, and the server 105. RSU1 and RSU2 may be simply referred to as RSU.

FIG. 3(a) shows the MBR submission scenarios. Assuming a vehicle V4 detects a misbehaving vehicle V5, V4 generates a MBR and submits it to the backend MA. The traditional method of misbehavior reporting is to submit MBR to the MA via direct communication link, e.g., via RSU connecting to the backend. However, this approach has problems. Sometimes, there may not be a direct connection available from V4 to a RSU and further to the MA. If there is no such communication connection, V4 has to buffer the MBR until the connectivity becomes available. If the period of losing connectivity to the MA is long, the local buffer of the vehicle V4 may become full and the vehicle V4 may have to drop MBRs, which allows the misbehaving vehicles escape from being reported. Also, the time without backend connectivity increases latency for other vehicles being aware of the misbehaviors. In addition, the latency of the traditional reporting approach is nontrivial as it needs to go through the backend, e.g., the vehicle V4 reports to the MA at the infrastructure, and then the DC at the infrastructure distributes the misbehavior decision via CRL to vehicles.

Embodiments herein may present three techniques complimentary to the existing reporting scheme below, which can have improved performance compared to the traditional approaches. These techniques may work together or independently in parallel to the existing direct reporting scheme to the backend.

Technique 1—submitting MBR via relay. If the vehicle does not have direct communication link to the infrastructure (e.g., RSU), it may rely on other vehicles to relay the MBR to the infrastructure. For example, the vehicle V4 generates a MBR regarding to malicious vehicle V5. However, the vehicle V4 is not in any RSU's coverage and hence does not have a direct connectivity to the MA. As a result, the vehicle V4 sends the MBR to a vehicle V6, who is in RSU2's coverage and forwards the MBR to RSU2 on behalf of the vehicle V4. As a result, the MBR may reach MA via the path V4-V6-RSU2-MA immediately, without waiting until V4 enters a RSU's coverage area. This approach may reduce the latency and increase the chance for the MBR reaching the MA at the backend. The MA replies to the reporter with an acknowledgement if it receives the MBR such that the reporting vehicle knows that the misbehavior reporting has been completed successfully and it may delete its local copy of the MBR. This relay technique may use Basic Transport Protocol (BTP)/GeoNetworking (GN) multi-hop over direct short range communications as the underlying transport protocol. Note that it is desired that the MA replies to the reporter with an acknowledgement no matter whether the misbehavior reporting is via relay or via direct communication through the RSU.

Technique 2—local collaborative MBR sharing. Besides uploading the misbehavior report to the infrastructure, the vehicle disseminates the information of detected misbehaviors via broadcasting to local neighbors, who are the most relevant to the misbehaviors as it may have direct impacts on the driving safety of local vehicles. Directly sharing the misbehavior observations with neighbors can reduce the latency for others being aware of the misbehaving vehicles as the reports now do not need to go through the infrastructure or the MA. It is a shortcut for the regular process pipeline. Note that MBR shared with neighbors may carry the evidence of the misbehavior. The vehicle who receives a MBR from a neighboring vehicle may validate the MBR (e.g., with local sensor information, with other V2X information) and make its own judgement. In addition, the receiver may keep a local copy of the received MBR as a proof. The communication profile of this technique may use BTP/GN SHB (Single Hop Broadcast) over direct short range communications. In the case that a RSU detects a misbehavior and generates a MBR, it can broadcast the MBR to all vehicles in its coverage area.

The misbehavior reporter (e.g. a vehicle, a RSU) may continue monitor the suspicious target and collect more information w.r.t the misbehavior as time goes. The reporter may share new evidences to increase the confidence of its previous MBR with the local neighborhood and/or the MA at the backend. Alternatively, if new evidences invalidate the previous misbehavior assessment, the reporter may recall its MBR by notifying the MA and/or the local neighborhood.

Technique 3—Directed forwarding MBR. For those vehicles that are also the neighbor of the misbehaving vehicle or in the area where the misbehaving one is heading, the misbehavior report may be valuable. A vehicle (or a RSU) receiving a MBR may validate the evidence in the report and then forward to other vehicles/RSU in the area where the misbehaving one is traveling to.

(1) Vehicle-based forwarding: For those vehicles that are also the neighbors of the misbehaving vehicle or in the area where the misbehaving vehicle is heading to, the MBR may be valuable. A vehicle (or a RSU) receiving a MBR message may validate the evidence in the MBR and then forward the MBR to other relevant vehicles/RSU (e.g., those in the area where the misbehaving vehicle is traveling to). During the forwarding, the intermediate vehicle may add its own observation or evidence to endorse the MBR. Only those MBRs that have impacts on the driving safety may be forwarded to relevant vehicles. Stop forwarding (and report to the MA) if sees the MBR untrustworthy.

The vehicle-based forwarding use case is illustrated in FIG. 3(b). After detecting misbehavior at a vehicle V1, a vehicle V2 generates a MBR and sends it to a vehicle V3. After receiving the MBR from V2, V3 validates it. If the MBR passes the verification, V3 determines the relevant vehicles and forwards this MBR to them. As V1 is travelling to the left, V4 and V5 are the relevant vehicles that are in the direction V1 is travelling to and may meet V1 in the near future. Therefore, V3 forwards the MBR to V4 and V5. Note that if V3 also detects the same misbehavior at V1, it may add its own evidence to the forwarded MBR.

Definition of vehicle relevance—vehicles that are or will be receiving V2X messages from the target misbehaving vehicle within time frame <t, t+Δt>, where t is the current timestamp, Δt is application specific parameter that controls the forwarding range. The relevance can be affected by misbehavior types, the target misbehaving vehicle's speed, heading, acceleration and communication range, etc. Before forwarding the MBR, the sender (or the forwarder) may perform relevance checking to determine the target receivers as the following: ① identify misbehavior types and attack types; ② calculate geographic area that is or will be impacted by the misbehavior; ③ forward the MBR to vehicles that are in the affected area.

A vehicle-based forwarding approach may include the following steps: (1) validate the MBR and identify misbehavior types, do not forward for security level misbehaviors, forward the MBR for semantic level misbehaviors; (2) monitor the traffic, do not forward the MBR if there are enough number of neighbors (a threshold may be predefined for the number of neighbors) that have forwarded this MBR already and it does not have any new evidence to add to the MBR; (3) perform relevance checking and determine the geographic area for forwarding the MBR, using GeoNetworking protocol or other protocols; (4) wait time $T_{forward}$ and then forward the MBR to relevant vehicles if has new evidence to add or no enough number of neighbors have forwarded the MBR to the same geographic area; and (5) limit frequency of forwarding for the same reporter and the same misbehavior.

(2) RSU-based forwarding. The Geo-dissemination of MBR may also be performed at the RSU level. A RSU may either receive a MBR from the original sender or a forwarder. The RSU may validate the MBR and perform relevance checking for the MBR. If the MBR is determined as relevant to vehicles within the RSU's coverage, the RSU will forward the MBR to those relevant vehicles. The RSU may append its own evidence regarding to the MBR if it has any.

FIG. 3(b) also provides an example of the RSU-level forwarding. V3 also sends the MBR to RSU2 as it is in RSU2's coverage. RSU2 may submit this MBR to the MA at the backend. On the other side, RSU2 shares this MBR with RSU1, which is in the area where the misbehaving vehicle V1 is travelling to. RSU1 validates the MBR and determines its relevance to the vehicles in RSU1's coverage. If RSU1 believes the MBR is relevant to its local neighborhood, it may broadcast the MBR to vehicles in its coverage (e.g., V6 and V7 in FIG. 3(b)).

The directed forwarding MBR approach reduces latency for being aware of misbehaviors in the neighborhood and allows local vehicles to be prepared or even take actions in advance. The range of the geographic forwarding depends on the relevance of the MBR.

A RSU-based forwarding approach may include the following steps: (1) validate the MBR, and do not forward when the MBR is suspicious, report the MBR to the MA instead; (2) perform relevance checking to determine vehicles in its coverage that are affected or might be affected (in near term) by the misbehavior reported in the MBR; (3) if number of potentially affected vehicles exceeds a predefined threshold, the RSU will forward the MBR to vehicles in its coverage, otherwise, it will not forward the MBR.

Note that above technique 3 adopts a short-term forwarding approach. The forwarding stops when the misbehaving vehicle changes its behavior or is revoked by CRL.

For technique 2 and technique 3, confidentiality is not required as the carried information is intended to be shared with a targeted neighborhood. The MBR is a result of misbehavior detection, whose evaluation metrics may include trust and confidence. Only misbehaviors having trust score below a predefined threshold with a confidence level over another predefined threshold should be considered for sharing via technique 2 and/or technique 3. Also, not all the misbehavior observations need to be shared. Only those misbehaviors that are related to driving safety should be shared/forwarded. For example, security level misbehaviors (including signature verification failure, timestamp expires, certificate expires, invalid geographic region, etc) do not need to be shared. On the other side, data at the semantic level is consumed by safety applications. Hence semantic level misbehaviors might have direct impacts on the driving safety and should be shared with the local community.

FIG. 4 illustrate example processes of various entities to be performed for distributing a CRL in a vehicular communication system 400, in accordance with some embodiments. In embodiments, the vehicular communication system 400 may be an example of the vehicular communication system 100 shown in FIG. 1(a). In detail, the vehicular communication system 400 includes RSU1, RSU2, and DC, which are examples of the device 103, the device 104, and the server 105. RSU1 and RSU2 in the description to follow may simply be referred to as RSU.

The current CRL distribution scheme adopted by the SCMS and other PKI systems distributes CRL at a global scale. The CRL carries all the entities to be revoked in the system. Consider the scale of the V2X system, the CRL can be very large, which makes the distribution of CRL very resource/bandwidth consuming. Especially due to the safety-critical nature of V2X system, it is desired to have CRL sent to vehicles on the road with a short latency. However, this requires to distribute CRL more frequently, leading to increasing overhead. Also, the current SCMS/CCMS requires to update the CRL every week, which might be enough for CA revocations, but not for vehicle revocations as it allows attackers to have up to one week to perform attack.

Embodiments herein present a comprehensive CRL framework that includes three major components: context-aware CRL update policy at the backend management entity, active CRL update at vehicles, and a RSU-based local CRL distribution.

Context-aware CRL update policy: DC (or other backend responsible entity) should update and sign CRL frequently (either periodically or triggered by events) to revoke compromised CAs and/or vehicles. The CRL may be updated if there are enough number of new entries (e.g., compromised entities) to add or refresh time is due. In addition, emergent update can be performed before regular periodic update if an attacker causing severe consequences is detected. Updated CRLs should be sent to the edge (e.g., a RSU, such as RSU1 or RSU2, a base station).

Active CRL update at vehicles: Vehicles may receive CRLs either by actively requesting CRL (full or delta) from a RSU (e.g., RSU1 or RSU2) or DC when needed or a update is due, or passively from the edge (a RSU such as RSU1/RSU2 or base station) using RSU-based local CRL distribution scheme as described below. For those vehicles that are not covered by any RSU, they may use P2PCD protocol defined in IEEE 1609.2 to request/distribute local CRLs to peer neighbors.

RSU-based local CRL distribution: we introduce an adaptive passive CRL distribution with tunable frequency provided by a RSU (e.g., RSU1/RSU2) by adding the RSU into the CRL distribution framework to improve the efficiency and robustness of the system. The operation details at the RSU (e.g., RSU1/RSU2) are as the following: (1) The RSU monitors the communications and hence knows the vehicles in its coverage; (2) After receiving the global CRL from the backend DC, the RSU creates a local CRL to include CA entries to be revoked as well as the revoked vehicles in the RSU's coverage area. (3) The RSU broadcasts the local CRL to vehicles.

With this mechanism, vehicles passively receives CRL updates from RSU with baseline distribution frequency of once every week. On top of the baseline distribution frequency, the RSU adjusts the frequency based on the context (impact factors). Factors to consider include the tolerance level for misbehaviors, the size of CRL(which can be a full CRL, a delta CRL or a localized CRL), the channel status and the delta between the new CRL and the previous CRL. For example, if the delta between the new CRL and the previous CRL is big, the new CRL (or a delta CRL) should be sent sooner.

In this way, the CRL can keep short as it does not need to carry revoked vehicles in a global scale (because only the local vehicles are relevant). Reducing the length of the CRL could bring many benefits (less to distribute, less to store, less to process), without affecting the safety of vehicles.

Moreover, the RSU may hand over the info of the revoked vehicle to its neighboring RSU in the area where the revoked vehicle is traveling to. Hence, a RSU network can track compromised vehicles and limit their impacts on the community.

Embodiments herein may present two ways for the RSU to create the local CRL. For a first approach, the RSU receives the global CRL from the DC (or multiple global CRLs from different DCs if the V2X system adopts a decentralized framework). Note that the global CRL is signed by the DC (or other backend authority that is responsible for the creation of the CRL). The RSU may verify the global CRL and the signature it carries. If the verification succeeds, the RSU extracts the CA revocation entries and vehicle revocation entries that are relevant (e.g., those vehicles should be within the RSU's coverage area), and then compiles them into a local CRL. The local CRL is signed by the RSU with its own signing certificates. It is assumed that vehicles who receive the local CRL should trust the RSU.

For a second approach, the RSU sends a vehicle list of those vehicles that are within its coverage area to the DC (or other backend authority that is responsible for the creation of the CRL). The DC customizes a local CRL for the RSU by putting the entries of revoked CAs and revoked vehicles that are also on the RSU's vehicle list together. The local CRL is then signed by the DC with the corresponding authority certificate. The signed CRL is then sent from the DC to the RSU, which then distributes it to the vehicles in the RSU's neighborhood. Here it is assumed that the vehicles should trust DC and may not trust the RSU.

RSU may provide the neighborhood with a comprehensive security management service for a variety of security-related operations, including CRL distribution, CA certificate distribution, misbehavior report local sharing/forwarding, etc. In DSRC or similar systems, where the bandwidth is divided into several channels, the RSU may announce the service on the control channel and send the service data on a non-critical service channel.

Figure 5:
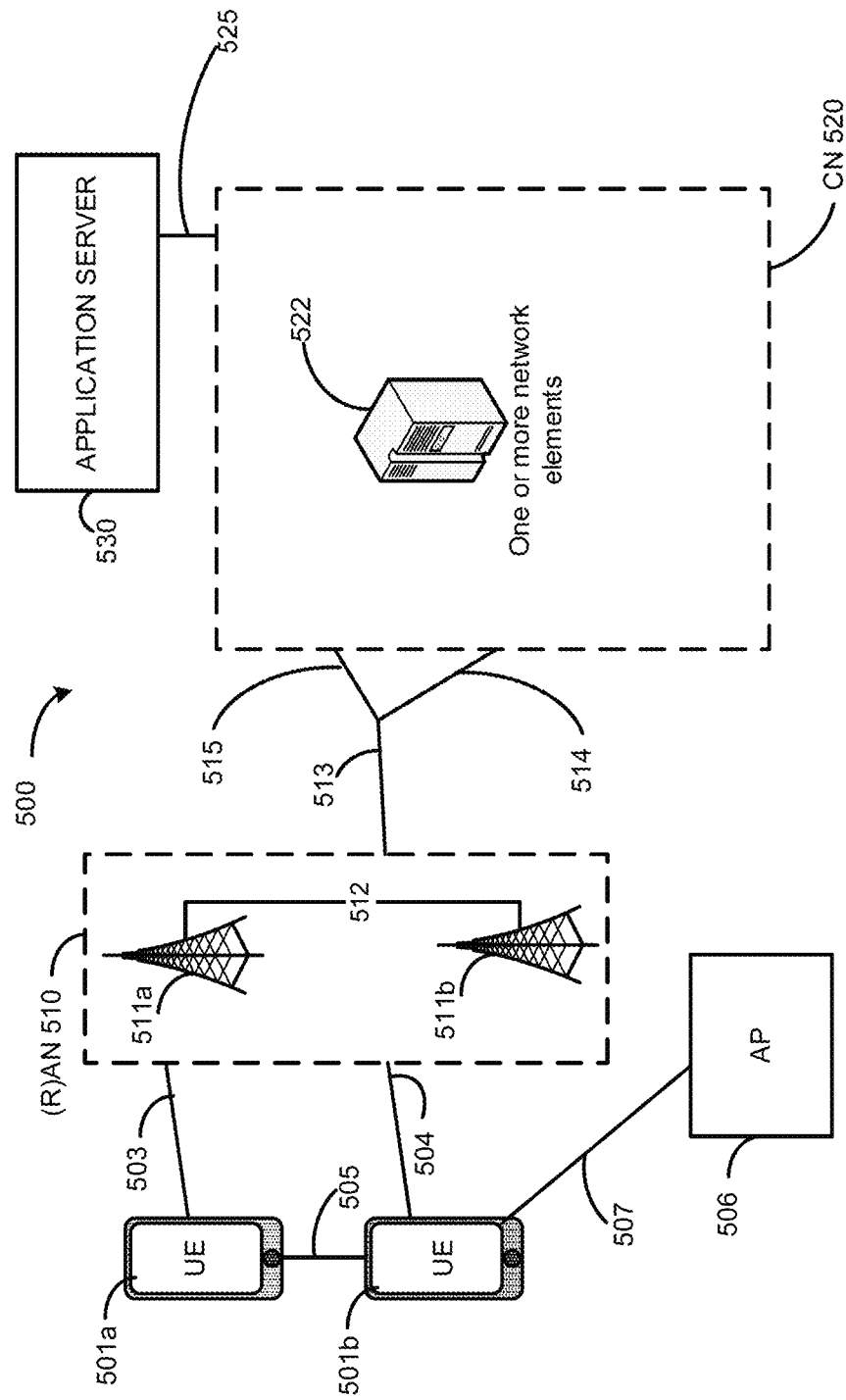
FIG. 5 illustrates an architecture of a system of a network, in accordance with various embodiments.
Figure 6:
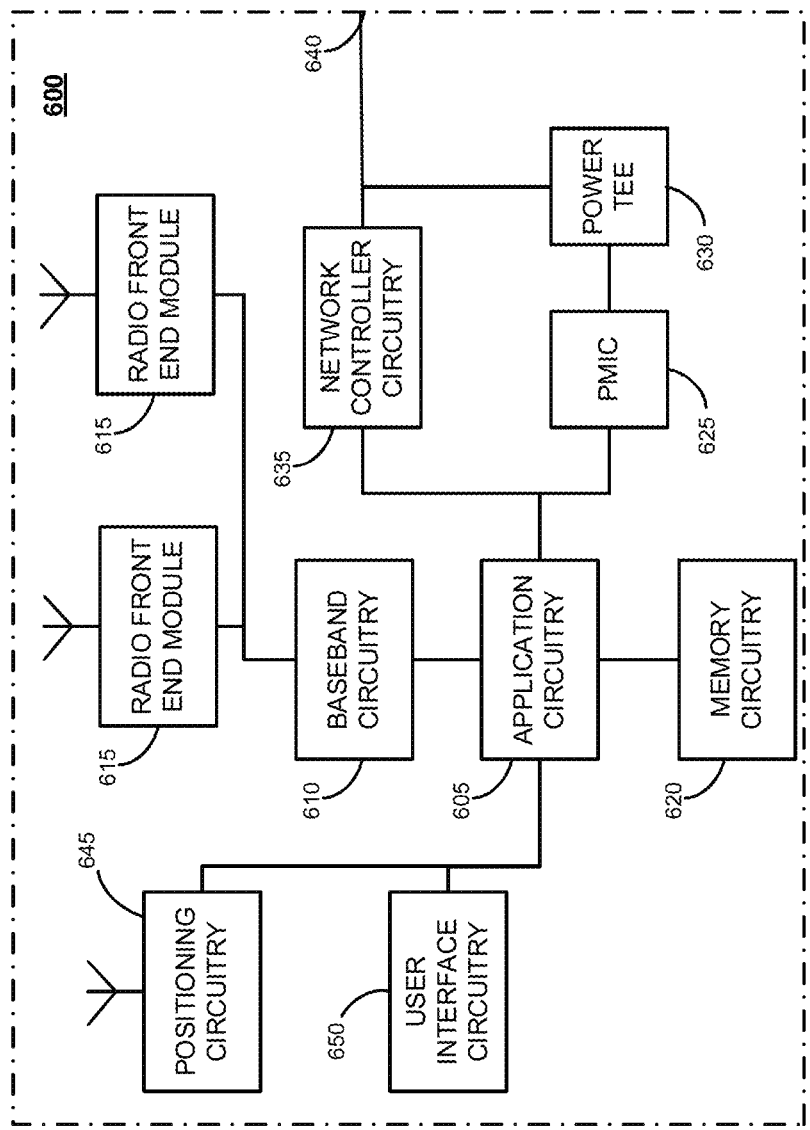
FIG. 6 illustrates an example of infrastructure equipment, in accordance with various embodiments.
Figure 7:
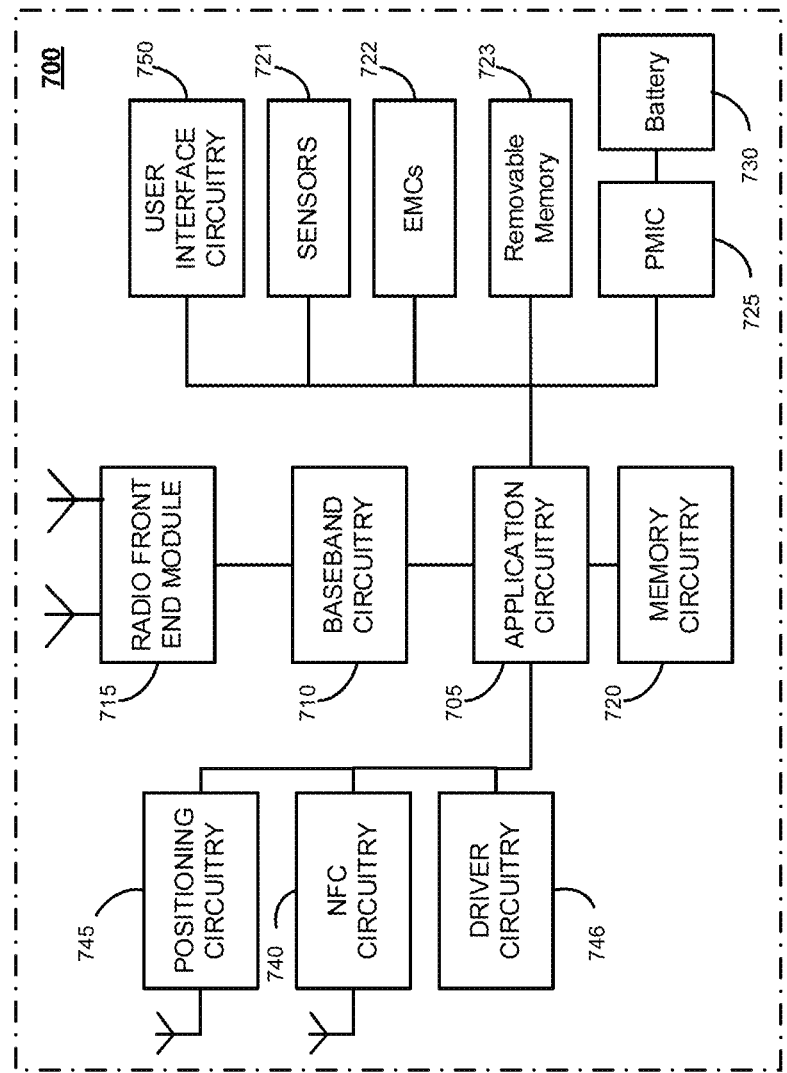
FIG. 7 illustrates an example of a platform, in accordance with various embodiments.
Figure 8:
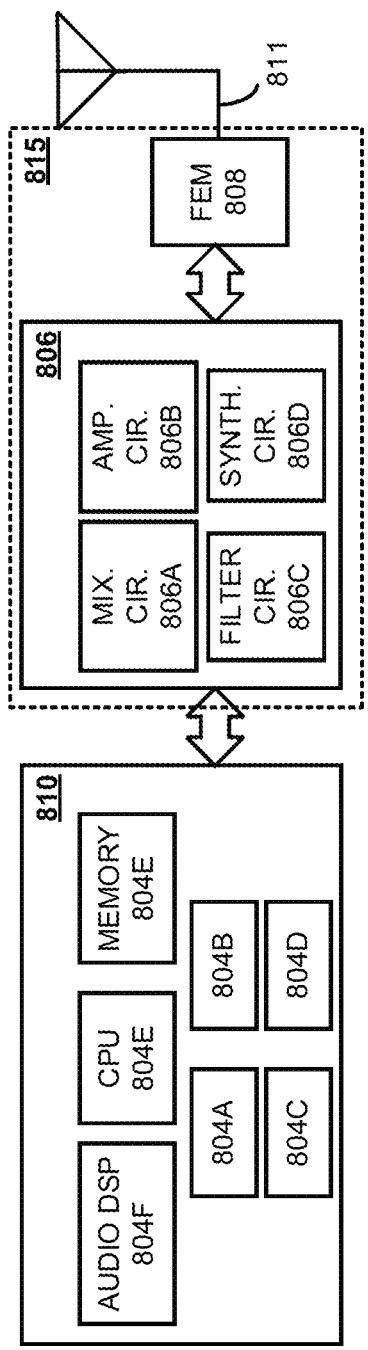
FIG. 8 illustrates example components of baseband circuitry, in accordance with various embodiments.
Figure 9:
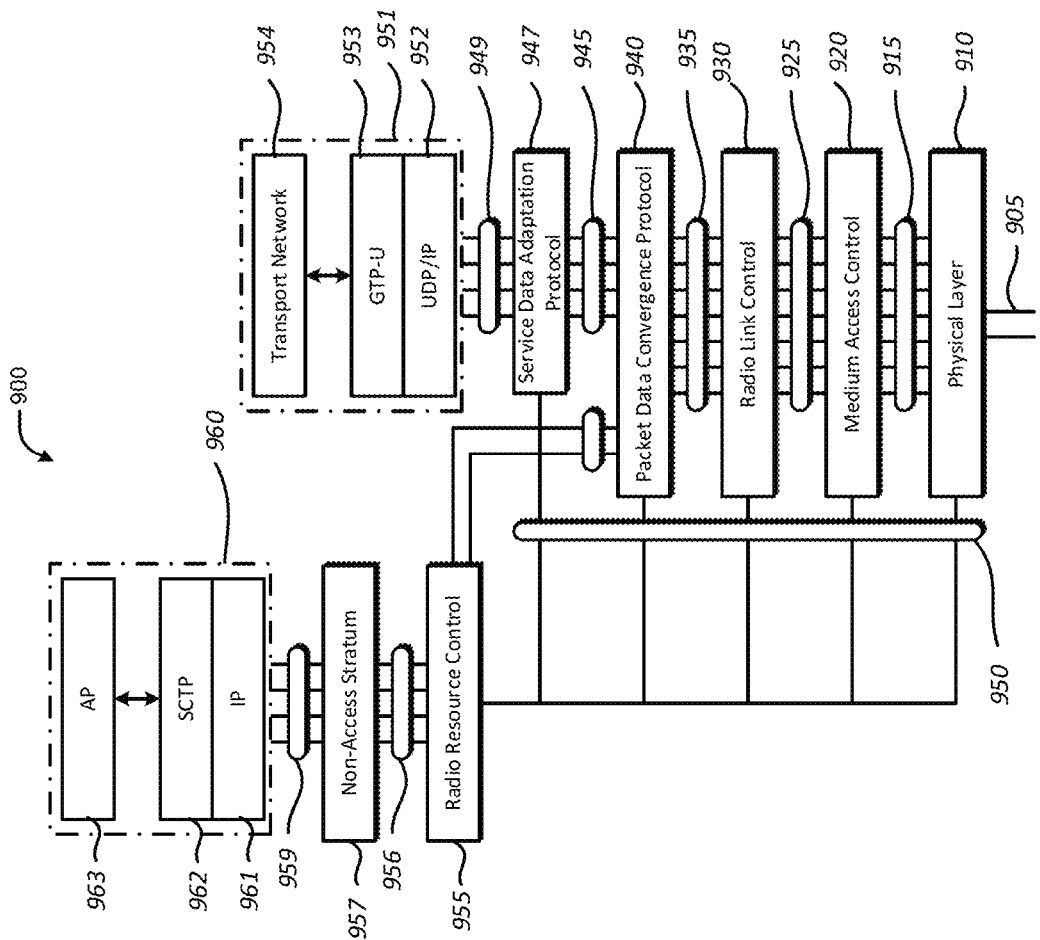
FIG. 9 illustrates various protocol functions that may be implemented in a wireless communication device, in accordance with various embodiments.
Figure 10:
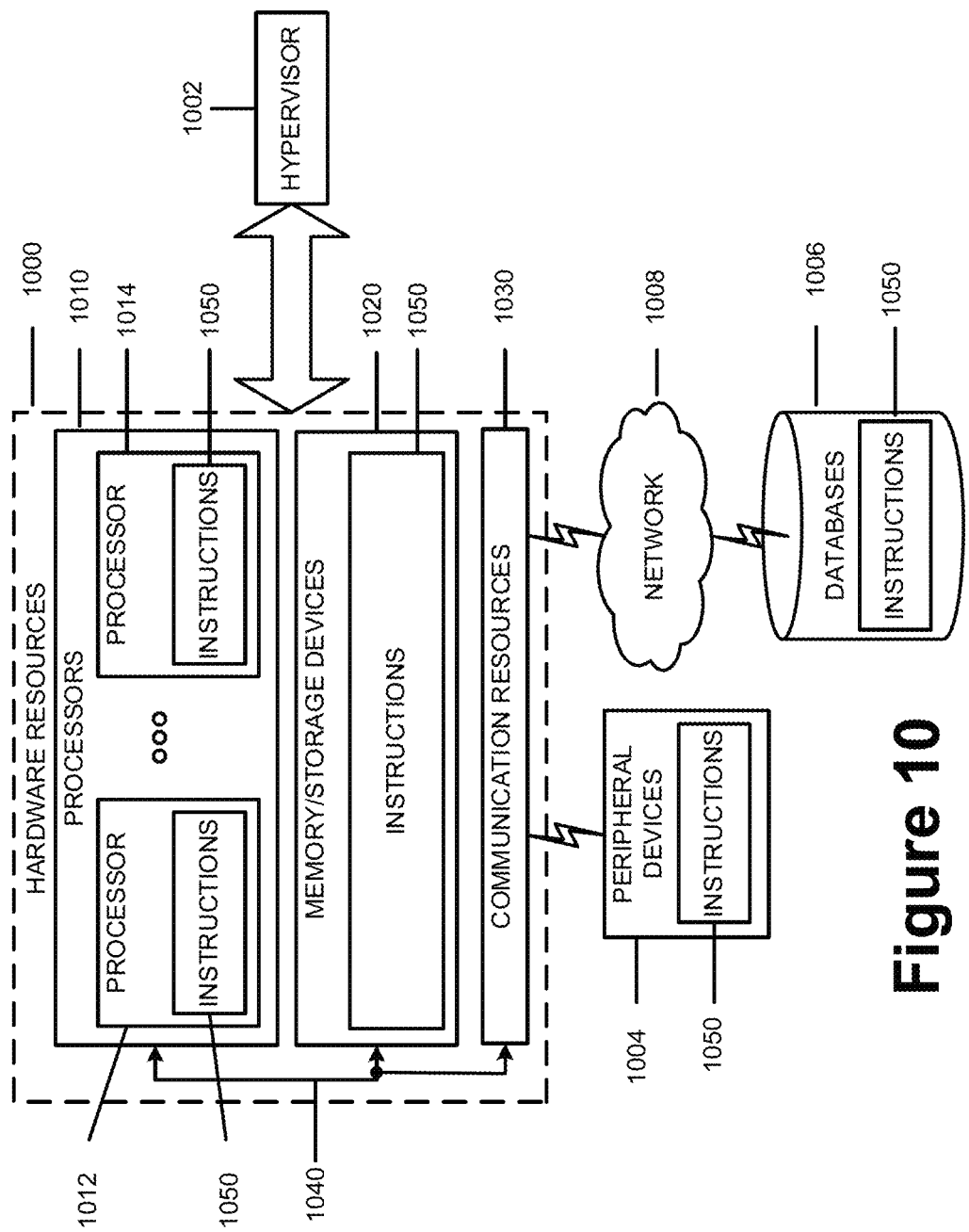
FIG. 10 is a block diagram illustrating components able to read instructions from a machine-readable or computer-readable medium, in accordance with various embodiments.

In embodiments, the vehicle 101, the device 103, and the server 105 as shown in FIG. 1(a) may be implemented by UE 501, RAN 510, CN 520 shown in FIG. 5. The operation flow or processes, e.g., the process 150, the process 160, the process 210, the process 230, and operations by various entities, e.g., the device 103 or the vehicle 101, may be implemented by a processing circuitry of a user equipment or a base station, e.g., application circuitry 605/705, baseband circuitry 610/710, or radio front end modules (RFEM) 615/715, as shown in FIGS. 6-7. FIG. 8 further illustrates example components of baseband circuitry 610/710 and RFEM 615/715. Furthermore, various details of the protocols involved in the process 150, the process 160, the process 210, the process 230 are illustrated in FIG. 9. Operations of the process 150, the process 160, the process 210, the process 230, and operations by various entities, e.g., the device 103 or the vehicle 101 may be stored in a machine-readable or computer-readable medium as shown in FIG. 10.

FIG. 5 illustrates an architecture of a system 500 of a network in accordance with some embodiments. The following description is provided for an example system 500 that operates in conjunction with the as Long Term Evolution (LTE) system standards and the Fifth Generation (5G) or New Radio (NR) system standards as provided by 3rd Generation Partnership Project (3GPP) technical specifications (TS). However, the example embodiments are not limited in this regard and the described embodiments may apply to other networks that benefit from the principles described herein, such as future 3GPP systems (e.g., Sixth Generation (6G)) systems, Institute of Electrical and Electronics Engineers (IEEE) 802.16 protocols (e.g., Wireless metropolitan area networks (MAN), Worldwide Interoperability for Microwave Access (WiMAX), etc.), or the like.

As shown by FIG. 5, the system 500 may include user equipment (UE) 501a and UE 501b (collectively referred to as "UEs 501" or "UE 501"). As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 501 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 501 can comprise an IoT UE, which may comprise a network access layer designed for low-power IoT applications utilizing short-lived UE connections. An IoT UE can utilize technologies such as M2M or MTC for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 may be configured to connect, for example, communicatively couple, with a access network (AN) or radio access network (RAN) 510. In embodiments, the RAN 510 may be a next generation (NG) RAN or a 5G RAN, an Evolved Universal Mobile Telecommunications System (UMTS) Terrestrial Radio Access Network (E-UTRAN), or a legacy RAN, such as a UTRAN (UMTS Terrestrial Radio Access Network) or GERAN (GSM (Global System for Mobile Communications or Groupe Special Mobile) EDGE (GSM Evolution) Radio Access Network). As used herein, the term "NG RAN" or the like may refer to a RAN 510 that operates in an NR or 5G system 500, and the term "E-UTRAN" or the like may refer to a RAN 510 that operates in an LTE or 4G system 500. The UEs 501 utilize connections (or channels) 503 and 504, respectively, each of which comprises a physical communications interface or layer (discussed in further detail below). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

In this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and/or any of the other communications protocols discussed herein. In embodiments, the UEs 501 may directly exchange communication data via a ProSe interface 505. The ProSe interface 505 may alternatively be referred to as a sidelink (SL) interface 505 and may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 501b is shown to be configured to access an access point (AP) 506 (also referred to as also referred to as "WLAN node 506", "WLAN 506", "WLAN Termination 506" or "WT 506" or the like) via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below). In various embodiments, the UE 501b, RAN 510, and AP 506 may be configured to utilize LTE-WLAN aggregation (LWA) operation and/or WLAN LTE/WLAN Radio Level Integration with IPsec Tunnel (LWIP) operation. The LWA operation may involve the UE 501b in RRC CONNECTED being configured by a RAN node 511 to utilize radio resources of LTE and WLAN. LWIP operation may involve the UE 501b using WLAN radio resources (e.g., connection 507) via Internet Protocol Security (IPsec) protocol tunneling to authenticate and encrypt packets (e.g., internet protocol (IP) packets) sent over the connection 507. IPsec tunneling may include encapsulating entirety of original IP packets and adding a new packet header thereby protecting the original header of the IP packets.

The RAN 510 can include one or more AN nodes or RAN nodes 511a and 511b (collectively referred to as "RAN nodes 511" or "RAN node 511") that enable the connections 503 and 504. As used herein, the terms "access node," "access point," or the like may describe equipment that provides the radio baseband functions for data and/or voice connectivity between a network and one or more users. These access nodes can be referred to as base stations (BS), next Generation NodeBs (gNBs), RAN nodes, evolved NodeBs (eNBs), NodeBs, Road Side Units (RSUs), Transmission Reception Points (TRxPs or TRPs), and so forth, and can comprise ground stations (e.g., terrestrial access points) or satellite stations providing coverage within a geographic area (e.g., a cell).

The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." An RSU is a computing device coupled with radiofrequency circuitry located on a roadside that provides connectivity support to passing vehicle UEs 501. The RSU may also include internal data storage circuitry to store intersection map geometry, traffic statistics, media, as well as applications/software to sense and control on-going vehicular and pedestrain traffic. The RSU may operate on the 5.9 GHz Direct Short Range Communications (DSRC) band to provide very low latency communications required for high speed events, such as crash avoidance, traffic warnings, and the like. In addition, the RSU may operate as a WiFi hotspot (2.4 GHz band) and/or provide connectivity to one or more cellular networks to provide uplink and downlink communications. The computing device and some or all of the radiofrequency circuitry of the RSU may be packaged in a weatherproof enclosure suitable for outdoor installation, and may include a network interface controller to provide a wired (e.g., Ethernet) connection to a traffic signal controller requiring and/or a backhaul network As used herein, the term "NG RAN node" or the like may refer to a RAN node 511 that operates in an NR or 5G system 500 (for example a gNB), and the term "E-UTRAN node" or the like may refer to a RAN node 511 that operates in an LTE or 4G system 500 (e.g., an eNB). According to various embodiments, the RAN nodes 511 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells. In other embodiments, the RAN nodes 511 may be implemented as one or more software entities running on server computers as part of a virtual network, which may be referred to as a cloud radio access network (CRAN). In other embodiments, the RAN nodes 511 may represent individual gNB-distributed units (DUs) that are connected to a gNB-centralized unit (CU) via an F1 interface (not shown by FIG. 5).

Any of the RAN nodes 511 can terminate the air interface protocol and can be the first point of contact for the UEs 501. In some embodiments, any of the RAN nodes 511 can fulfill various logical functions for the RAN 510 including, but not limited to, radio network controller (RNC) functions such as radio bearer management, uplink and downlink dynamic radio resource management and data packet scheduling, and mobility management.

In embodiments, the UEs 501 can be configured to communicate using Orthogonal Frequency-Division Multiplexing (OFDM) communication signals with each other or with any of the RAN nodes 511 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 to the UEs 501, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 501 and the RAN nodes 511 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 501 and the RAN nodes 511 may operate using Licensed Assisted Access (LAA), enhanced LAA (eLAA), and/or further eLAA (feLAA) mechanisms. In these implementations, the UEs 501 and the RAN nodes 511 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 501, RAN nodes 511, etc.) senses a medium (for example, a channel or carrier frequency) and transmits when the medium is sensed to be idle (or when a specific channel in the medium is sensed to be unoccupied). The medium sensing operation may include clear channel assessment (CCA), which utilizes at least energy detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing radiofrequency (RF) energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called carrier sense multiple access with collision avoidance (CSMA/CA). Here, when a WLAN node (e.g., a mobile station (MS) such as UEs 501, AP 506, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the contention window size (CWS), which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y extended CCA (ECCA) slots, where X and Y are minimum and maximum values for the CWSs for LAA. In one example, the minimum CWS for an LAA transmission may be 9 microseconds (μs); however, the size of the CWS and a maximum channel occupancy time (MCOT) (for example, a transmission burst) may be based on governmental regulatory requirements.

The LAA mechanisms are built upon carrier aggregation (CA) technologies of LTE-Advanced systems. In CA, each aggregated carrier is referred to as a component carrier (CC). A CC may have a bandwidth of 1.4, 3, 5, 10, 15 or 20 MHz and a maximum of five CCs can be aggregated, and therefore, a maximum aggregated bandwidth is 100 MHz. In Frequency Division Duplexing (FDD) systems, the number of aggregated carriers can be different for DL and UL, where the number of UL CCs is equal to or lower than the number of DL component carriers. In some cases, individual CCs can have a different bandwidth than other CCs. In Time Division Duplexing (TDD) systems, the number of CCs as well as the bandwidths of each CC is usually the same for DL and UL.

CA also comprises individual serving cells to provide individual CCs. The coverage of the serving cells may differ, for example, due to that CCs on different frequency bands will experience different pathloss. A primary service cell or primary cell (PCell) may provide a Primary CC (PCC) for both UL and DL, and may handle Radio Resource Control (RRC) and Non-Access Stratum (NAS) related activities. The other serving cells are referred to as secondary cells (SCells), and each SCell may provide an individual Secondary CC (SCC) for both UL and DL. The SCCs may be added and removed as required, while changing the PCC may require the UEs 501 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different Physical Uplink Shared Channel (PUSCH) starting positions within a same subframe.

The physical downlink shared channel (PDSCH) may carry user data and higher-layer signaling to the UEs 501. The physical downlink control channel (PDCCH) may carry information about the transport format and resource allocations related to the PDSCH channel, among other things. It may also inform the UEs 501 about the transport format, resource allocation, and H-ARQ (Hybrid Automatic Repeat Request) information related to the uplink shared channel. Typically, downlink scheduling (assigning control and shared channel resource blocks to the UE 501b within a cell) may be performed at any of the RAN nodes 511 based on channel quality information fed back from any of the UEs 501. The downlink resource assignment information may be sent on the PDCCH used for (e.g., assigned to) each of the UEs 501.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN nodes 511 may be configured to communicate with one another via interface 512. In embodiments where the system 500 is an LTE system, the interface 512 may be an X2 interface 512. The X2 interface may be defined between two or more RAN nodes 511 (e.g., two or more eNBs and the like) that connect to EPC, and/or between two eNBs connecting to EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB (MeNB) to a secondary eNB (SeNB); information about successful in sequence delivery of PDCP PDUs to a UE 501 from an SeNB for user data; information of PDCP PDUs that were not delivered to a UE 501; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 500 is a 5G or NR system, the interface 512 may be an Xn interface 512.The Xn interface is defined between two or more RAN nodes 511 (e.g., two or more gNBs and the like) that connect to CN 520, between a RAN node 511 (e.g., a gNB) connecting to CN 520 and an eNB, and/or between two eNBs connecting to CN 520. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 501 in a connected mode (e.g., CM-CONNECTED) including functionality to manage the UE mobility for connected mode between one or more RAN nodes 511. The mobility support may include context transfer from an old (source) serving RAN node 511 to new (target) serving RAN node 511; and control of user plane tunnels between old (source) serving RAN node 511 to new (target) serving RAN node 511. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 510 is shown to be communicatively coupled to a core network—in this embodiment, Core Network (CN) 520. The CN 520 may comprise a plurality of network elements 522, which are configured to offer various data and telecommunications services to customers/subscribers (e.g., users of UEs 501) who are connected to the CN 520 via the RAN 510. The term "network element" may describe a physical or virtualized equipment used to provide wired or wireless communication network services. The term "network element" may be considered synonymous to and/or referred to as a networked computer, networking hardware, network equipment, router, switch, hub, bridge, radio network controller, radio access network device, gateway, server, virtualized network function (VNF), network functions virtualization infrastructure (NFVI), and/or the like. The components of the CN 520 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above described network node functions via executable instructions stored in one or more computer readable storage mediums (described in further detail below). A logical instantiation of the CN 520 may be referred to as a network slice, and a logical instantiation of a portion of the CN 520 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 530 may be an element offering applications that use IP bearer resources with the core network (e.g., UMTS Packet Services (PS) domain, LTE PS data services, etc.). The application server 530 can also be configured to support one or more communication services (e.g., Voice-over-Internet Protocol (VoIP) sessions, PTT sessions, group communication sessions, social networking services, etc.) for the UEs 501 via the EPC 520.

In embodiments, the CN 520 may be a 5GC (referred to as "5GC 520" or the like), and the RAN 510 may be connected with the CN 520 via an NG interface 513. In embodiments, the NG interface 513 may be split into two parts, an NG user plane (NG-U) interface 514, which carries traffic data between the RAN nodes 511 and a user plane function (UPF), and the S1 control plane (NG-C) interface 515, which is a signaling interface between the RAN nodes 511 and Access and Mobility Functions (AMFs). Embodiments where the CN 520 is a 5GC 520 are discussed in more detail with regard to FIG. 7.

In embodiments, the CN 520 may be a 5G CN (referred to as "5GC 520" or the like), while in other embodiments, the CN 520 may be an Evolved Packet Core (EPC)). Where CN 520 is an EPC (referred to as "EPC 520" or the like), the RAN 510 may be connected with the CN 520 via an S1 interface 513. In embodiments, the S1 interface 53 may be split into two parts, an S1 user plane (S1-U) interface 514, which carries traffic data between the RAN nodes 511 and the serving gateway (S-GW), and the S1-mobility management entity (MME) interface 515, which is a signaling interface between the RAN nodes 511 and MMEs.

In embodiments, the UE 501, RAN 510 (with RAN nodes 511), CN 520 may be an implementation of the vehicle 101, the device 103, and the server 105 as shown in FIG. 1(a).

FIG. 6 illustrates an example of infrastructure equipment 600 in accordance with various embodiments. The infrastructure equipment 600 (or "system 600") may be implemented as a base station, radio head, RAN node, etc., such as the RAN nodes 511 of RAN node 510 and/or AP 506 shown and described previously. As described earlier, RAN node 510 with RAN nodes 511 may be devices 103 of FIG. 1. In other examples, the system 600 could be implemented in or by a UE, application server(s) 530, and/or any other element/device discussed herein. The system 600 may include one or more of application circuitry 605, baseband circuitry 610, one or more radio front end modules 615, memory 620, power management integrated circuitry (PMIC) 625, power tee circuitry 630, network controller 635, network interface connector 640, satellite positioning circuitry 645, and user interface 650. In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network 520 (or CN 70 discussed infra) may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry 605 may include one or more central processing unit (CPU) cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 605 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 600 may not utilize application circuitry 605, and instead may include a special-purpose processor/controller to process IP data received from an EPC or 5GC, for example.

Additionally or alternatively, application circuitry 605 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 605 may comprise logic blocks or logic fabric including and other interconnected resources that may be programmed to perform various functions, such as the procedures, methods, functions, etc. of the various embodiments discussed herein. In such embodiments, the circuitry of application circuitry 605 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 610 may be implemented, for example, as a solder-down substrate including one or more integrated circuits, a single packaged integrated circuit soldered to a main circuit board or a multi-chip module containing two or more integrated circuits. Although not shown, baseband circuitry 610 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 610 may include protocol processing circuitry with one or more instances of control circuitry (not shown) to provide control functions for the digital baseband circuitry and/or radio frequency circuitry (e.g., the radio front end modules 615).

User interface circuitry 650 may include one or more user interfaces designed to enable user interaction with the system 600 or peripheral component interfaces designed to enable peripheral component interaction with the system 600. User interfaces may include, but are not limited to one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 615 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 615. The RFEMs 615 may incorporate both millimeter wave antennas and sub-millimeter wave antennas.

The memory circuitry 620 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 620 may be implemented as one or more of solder down packaged integrated circuits, socketed memory modules and plug-in memory cards.

The PMIC 625 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 630 may provide for electrical power drawn from a network cable to provide both power supply and data connectivity to the infrastructure equipment 600 using a single cable.

The network controller circuitry 635 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 600 via network interface connector 640 using a physical connection, which may be electrical (commonly referred to as a "copper interconnect"), optical, or wireless. The network controller circuitry 635 may include one or more dedicated processors and/or FPGAs to communicate using one or more of the aforementioned protocols. In some implementations, the network controller circuitry 635 may include multiple controllers to provide connectivity to other networks using the same or different protocols.

The positioning circuitry 645, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 645 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 645 and/or positioning circuitry implemented by UEs 501, or the like) to determine their GNSS position. The GNSS signals may include a pseudo-random code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 645 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 645 may provide data to application circuitry 605 which may include one or more of position data or time data. Application circuitry 605 may use the time data to synchronize operations with other radio base stations (e.g., RAN nodes 511 or the like).

The components shown by FIG. 6 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an $I^2C$ interface, an SPI interface, point to point interfaces, and a power bus, among others.

FIG. 7 illustrates an example of a platform 700 (or "device 700") in accordance with various embodiments. In embodiments, the computer platform 700 may be suitable for use as UEs 501, 601, application servers 530, and/or any other element/device discussed herein. The platform 700 may include any combinations of the components shown in the example. The components of platform 700 may be implemented as integrated circuits (ICs), portions thereof, discrete electronic devices, or other modules, logic, hardware, software, firmware, or a combination thereof adapted in the computer platform 700, or as components otherwise incorporated within a chassis of a larger system. The block diagram of FIG. 7 is intended to show a high level view of components of the computer platform 700. However, some of the components shown may be omitted, additional components may be present, and different arrangement of the components shown may occur in other implementations.

The application circuitry 705 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock (RTC), timer-counters including interval and watchdog timers, general purpose input-output (TO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform 700. In some embodiments, processors of application circuitry 605/705 may process IP data packets received from an EPC or 5GC.

Application circuitry 705 be or include a microprocessor, a multi-core processor, a multithreaded processor, an ultra-low voltage processor, an embedded processor, or other known processing element. In one example, the application circuitry 705 may include an Intel® Architecture Core™ based processor, such as a Quark™, an Atom™, an i3, an i5, an i7, or an MCU-class processor, or another such processor available from Intel® Corporation, Santa Clara, CA. The processors of the application circuitry 705 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc; an ARM-based design licensed from ARM Holdings, Ltd.; or the like. In some implementations, the application circuitry 705 may be a part of a system on a chip (SoC) in which the application circuitry 705 and other components are formed into a single integrated circuit, or a single package, such as the Edison™ or Galileo™ SoC boards from Intel® Corporation.

Additionally or alternatively, application circuitry 705 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 705 may comprise logic blocks or logic fabric including and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), antifuses, etc.) used to store logic blocks, logic fabric, data, etc. in lookup-tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits. Although not shown, baseband circuitry 710 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 710 may include protocol processing circuitry with one or more instances of control circuitry (not shown) to provide control functions for the digital baseband circuitry and/or radio frequency circuitry (e.g., the radio front end modules 715).

The radio front end modules (RFEMs) 715 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 715. The RFEMs 715 may incorporate both millimeter wave antennas and sub-millimeter wave antennas.

The memory circuitry 720 may include any number and type of memory devices used to provide for a given amount of system memory. As examples, the memory circuitry 720 may include one or more of volatile memory including be random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 720 may be developed in accordance with a Joint Electron Devices Engineering Council (JEDEC) low power double data rate (LPDDR)-based design, such as LPDDR2, LPDDR3, LPDDR4, or the like. Memory circuitry 720 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 720 may be on-die memory or registers associated with the application circuitry 705. To provide for persistent storage of information such as data, applications, operating systems and so forth, memory circuitry 720 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 700 may incorporate the three-dimensional (3D) cross-point (XPOINT) memories from Intel® and Micron®.

Removable memory circuitry 723 may include devices, circuitry, enclosures/housings, ports or receptacles, etc. used to coupled portable data storage devices with the platform 700. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 700 may also include interface circuitry (not shown) that is used to connect external devices with the platform 700. The external devices connected to the platform 700 via the interface circuitry may include sensors 721, such as accelerometers, level sensors, flow sensors, temperature sensors, pressure sensors, barometric pressure sensors, and the like. The interface circuitry may be used to connect the platform 700 to electro-mechanical components (EMCs) 722, which may allow platform 700 to change its state, position, and/or orientation, or move or control a mechanism or system. The EMCs 722 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 700 may be configured to operate one or more EMCs 722 based on one or more captured events and/or instructions or control signals received from a service provider and/or various clients.

In some implementations, the interface circuitry may connect the platform 700 with positioning circuitry 745, which may be the same or similar as the positioning circuitry 645 discussed with regard to FIG. 6.

In some implementations, the interface circuitry may connect the platform 700 with near-field communication (NFC) circuitry 740, which may include an NFC controller coupled with an antenna element and a processing device.

The NFC circuitry 740 may be configured to read electronic tags and/or connect with another NFC-enabled device.

The driver circuitry 746 may include software and hardware elements that operate to control particular devices that are embedded in the platform 700, attached to the platform 700, or otherwise communicatively coupled with the platform 700. The driver circuitry 746 may include individual drivers allowing other components of the platform 700 to interact or control various input/output (I/O) devices that may be present within, or connected to, the platform 700. For example, driver circuitry 746 may include a display driver to control and allow access to a display device, a touchscreen driver to control and allow access to a touchscreen interface of the platform 700, sensor drivers to obtain sensor readings of sensors 721 and control and allow access to sensors 721, EMC drivers to obtain actuator positions of the EMCs 722 and/or control and allow access to the EMCs 722, a camera driver to control and allow access to an embedded image capture device, audio drivers to control and allow access to one or more audio devices.

The power management integrated circuitry (PMIC) 725 (also referred to as "power management circuitry 725") may manage power provided to various components of the platform 700. In particular, with respect to the baseband circuitry 710, the PMIC 725 may control power-source selection, voltage scaling, battery charging, or DC-to-DC conversion. The PMIC 725 may often be included when the platform 700 is capable of being powered by a battery 730, for example, when the device is included in a UE 501, 601.

In some embodiments, the PMIC 725 may control, or otherwise be part of, various power saving mechanisms of the platform 700. For example, if the platform 700 is in an RRC Connected state, where it is still connected to the RAN node as it expects to receive traffic shortly, then it may enter a state known as Discontinuous Reception Mode (DRX) after a period of inactivity. During this state, the platform 700 may power down for brief intervals of time and thus save power. If there is no data traffic activity for an extended period of time, then the platform 700 may transition off to an RRC Idle state, where it disconnects from the network and does not perform operations such as channel quality feedback, handover, etc. The platform 700 goes into a very low power state and it performs paging where again it periodically wakes up to listen to the network and then powers down again. The platform 700 may not receive data in this state, in order to receive data, it must transition back to RRC Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 730 may power the platform 700, although in some examples the platform 700 may be mounted deployed in a fixed location, and may have a power supply coupled to an electrical grid. The battery 730 may be a lithium ion battery, a metal-air battery, such as a zinc-air battery, an aluminum-air battery, a lithium-air battery, and the like. In some implementations, such as in V2X applications, the battery 730 may be a typical lead-acid automotive battery.

In some implementations, the battery 730 may be a "smart battery," which includes or is coupled with a Battery Management System (BMS) or battery monitoring integrated circuitry. The BMS may be included in the platform 700 to track the state of charge (SoCh) of the battery 730. The BMS may be used to monitor other parameters of the battery 730 to provide failure predictions, such as the state of health (SoH) and the state of function (SoF) of the battery 730. The BMS may communicate the information of the battery 730 to the application circuitry 705 or other components of the platform 700. The BMS may also include an analog-to-digital (ADC) convertor that allows the application circuitry 705 to directly monitor the voltage of the battery 730 or the current flow from the battery 730. The battery parameters may be used to determine actions that the platform 700 may perform, such as transmission frequency, network operation, sensing frequency, and the like.

A power block, or other power supply coupled to an electrical grid may be coupled with the BMS to charge the battery 730. In some examples, the power block 528 may be replaced with a wireless power receiver to obtain the power wirelessly, for example, through a loop antenna in the computer platform 700. In these examples, a wireless battery charging circuit may be included in the BMS. The specific charging circuits chosen may depend on the size of the battery 730, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform 700 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an I$^2$C interface, an SPI interface, point to point interfaces, and a power bus, among others.

FIG. 8 illustrates example components of baseband circuitry 610/710 and radio front end modules (RFEM) 615/715 in accordance with various embodiments. As shown, the RFEM 615/715 may include Radio Frequency (RF) circuitry 806, front-end module (FEM) circuitry 808, one or more antennas 811 coupled together at least as shown.

The baseband circuitry 610/710 may include circuitry such as, but not limited to, one or more single-core or multi-core processors. The baseband circuitry 610/710 may include one or more baseband processors or control logic to process baseband signals received from a receive signal path of the RF circuitry 806 and to generate baseband signals for a transmit signal path of the RF circuitry 806. Baseband processing circuity 610/710 may interface with the application circuitry 605/705 for generation and processing of the baseband signals and for controlling operations of the RF circuitry 806. For example, in some embodiments, the baseband circuitry 610/710 may include a third generation (3G) baseband processor 804A, a fourth generation (4G) baseband processor 804B, a fifth generation (5G) baseband processor 804C, or other baseband processor(s) 804D for other existing generations, generations in development or to be developed in the future (e.g., second generation (2G), si 10h generation (6G), etc.). The baseband circuitry 610/710 (e.g., one or more of baseband processors 804A-D) may handle various radio control functions that enable communication with one or more radio networks via the RF circuitry 806. In other embodiments, some or all of the functionality of baseband processors 804A-D may be included in modules stored in the memory 804G and executed via a Central Processing Unit (CPU) 804E. The radio control functions may include, but are not limited to, signal modulation/demodulation, encoding/decoding, radio frequency shifting, etc. In some embodiments, modulation/demodulation circuitry of the baseband circuitry 610/710 may include Fast-Fourier Transform (FFT), precoding, or constellation mapping/demapping functionality. In some embodiments, encoding/decoding circuitry of the baseband circuitry 610/710 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 610/710 may include one or more audio digital signal processor(s) (DSP) 804F. The audio DSP(s) 804F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 610/710 and the application circuitry 605/705 may be implemented together such as, for example, on a system on a chip (SOC).

In some embodiments, the baseband circuitry 610/710 may provide for communication compatible with one or more radio technologies. For example, in some embodiments, the baseband circuitry 610/710 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 610/710 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 610/710. RF circuitry 806 may also include a transmit signal path which may include circuitry to up-convert baseband signals provided by the baseband circuitry 610/710 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 610/710 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 610/710 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 610/710 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 610/710 or the applications processor 605/705 depending on the desired output frequency. In some embodiments, a divider control input (e.g., N) may be determined from a look-up table based on a channel indicated by the applications processor 605/705.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 811, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 811. In various embodiments, the amplification through the transmit or receive signal paths may be done solely in the RF circuitry 806, solely in the FEM 808, or in both the RF circuitry 806 and the FEM 808.

In some embodiments, the FEM circuitry 808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 811).

Processors of the application circuitry 605/705 and processors of the baseband circuitry 610/710 may be used to execute elements of one or more instances of a protocol stack. For example, processors of the baseband circuitry 610/710, alone or in combination, may be used execute Layer 3, Layer 2, or Layer 1 functionality, while processors of the baseband circuitry 610/710 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

FIG. 9 illustrates various protocol functions that may be implemented in a wireless communication device according to various embodiments. In particular, FIG. 9 includes an arrangement 900 showing interconnections between various protocol layers/entities. The following description of FIG. 9 is provided for various protocol layers/entities that operate in conjunction with the Fifth Generation (5G) or New Radio (NR) system standards and LTE system standards, but some or all of the aspects of FIG. 9 may be applicable to other wireless communication network systems as well. The protocol layers/entities shown in the arrangement 900 may be involved in any of the communications between the vehicle 101, the device 103, and the server 105 as shown in FIG. 1(*a*), the process 150, the process 160, the process 210, the process 230. Any operations performed by the vehicle 101, the device 103, and the server 105, or operations of the process 150, the process 160, the process 210, the process 230 may go through multiple protocol layers as shown in the arrangement 900.

The protocol layers of arrangement 900 may include one or more of a physical layer (PHY) 910, a medium access control layer (MAC) 920, a radio link control layer (RLC) 930, a packet data convergence protocol layer (PDCP) 940, a service data adaptation protocol layer (SDAP) 947, a radio resource control layer (RRC) 955, and a non-access stratum (NAS) layer 957, in addition to other higher layer functions not illustrated. The protocol layers may include one or more service access points (e.g., items 959, 956, 950, 949, 945, 935, 925, and 915 in FIG. 9) that may provide communication between two or more protocol layers.

The PHY 910 may transmit and receive physical layer signals 905 that may be received from or transmitted to one or more other communication devices. The physical layer signals 905 may comprise one or more physical channels, such as those discussed herein. The PHY 910 may further perform link adaptation or adaptive modulation and coding (AMC), power control, cell search (e.g., for initial synchronization and handover purposes), and other measurements used by higher layers, such as the RRC 955. The PHY 910 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing. In embodiments, an instance of PHY 910 may process requests from and provide indications to an instance of MAC 920 via one or more physical layer service access points (PHY-SAP) 915. According to some embodiments, requests and indications communicated via PHY-SAP 915 may comprise one or more transport channels.

Instance(s) of MAC 920 may process requests from and provide indications to an instance of RLC 930 via one or more medium access control service access points (MAC-SAP) 925. These requests and indications communicated via the MAC-SAP 925 may comprise one or more logical channels. The MAC 920 may perform mapping between the logical channels and transport channels, multiplexing of MAC SDUs from one or more logical channels onto transport blocks (TB) to be delivered to PHY 910 via the transport channels, de-multiplexing MAC SDUs to one or more logical channels from TBs delivered from the PHY 910 via transport channels, multiplexing MAC SDUs onto TBs, scheduling information reporting, error correction through hybrid automatic repeat request (HARM), and logical channel prioritization.

Instance(s) of RLC 930 may process requests from and provide indications to an instance of PDCP 940 via one or more radio link control service access points (RLC-SAP) 935. These requests and indications communicated via RLC-SAP 935 may comprise one or more RLC channels. The RLC 930 may operate in a plurality of modes of operation, including: Transparent Mode (TM), Unacknowledged Mode (UM), and Acknowledged Mode (AM). The RLC 930 may execute transfer of upper layer protocol data units (PDUs), error correction through automatic repeat request (ARQ) for AM data transfers, and concatenation, segmentation and reassembly of RLC SDUs for UM and AM data transfers. The RLC 930 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 940 may process requests from and provide indications to instance(s) of RRC 955 and/or instance(s) of SDAP 947 via one or more packet data convergence protocol service access points (PDCP-SAP) 945. These requests and indications communicated via PDCP-SAP 945 may comprise one or more radio bearers. The PDCP layer 904 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 947 may process requests from and provide indications to one or more higher layer protocol entities via one or more service data adaptation protocol service access points (SDAP-SAP) 949. These requests and indications communicated via SDAP-SAP 949 may comprise one or more quality of service (QoS) flows. The SDAP 947 may map QoS flows to data radio bearers (DRBs), and vice versa, and may also mark QoS flow IDs (QFIs) in DL and UL packets. A single SDAP entity 947 may be configured for an individual PDU session. In the UL direction, the NG-RAN 520 may control the mapping of QoS Flows to DRB(s) in two different ways, reflective mapping or explicit mapping. For reflective mapping, the SDAP 947 of a UE 501 may monitor the QoS flow ID(s) of the DL packets for each DRB, and may apply the same mapping for packets flowing in the UL direction. For a DRB, the SDAP 947 of the UE 501 may map the UL packets belonging to the QoS flows(s) corresponding to the QoS flow ID(s) and PDU Session observed in the DL packets for that DRB. To enable reflective mapping, the NG-RAN 710 may mark DL packets over the Uu interface with a QoS flow ID. The explicit mapping may involve the RRC 955 configuring the SDAP 947 with an explicit QoS flow to DRB mapping rule, which may be stored and followed by the SDAP 947. In embodiments, the SDAP 947 may only be used in NR implementations and may not be used in LTE implementations.

The RRC 955 may configure, via one or more management service access points (M-SAP), aspects of one or more protocol layers, which may include one or more instances of PHY 910, MAC 920, RLC 930, PDCP 940 and SDAP 947. In embodiments, an instance of RRC 955 may process requests from and provide indications to one or more NAS entities 957 via one or more RRC service access points (RRC-SAP) 956. The main services and functions of the RRC 955 may include broadcast of system information (e.g., included in Master Information Blocks (MIBs) or System Information Blocks (SIBs) related to the NAS), broadcast of system information related to the access stratum (AS), paging, establishment, maintenance and release of an RRC connection between the UE 501 and RAN 520 (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. The MIBs and SIBs may comprise one or more information elements (IEs), which may each comprise individual data fields or data structures.

The NAS 957 may form the highest stratum of the control plane between the UE 501 and the AMF 721. The NAS 957 may support the mobility of the UEs 501 and the session management procedures to establish and maintain IP connectivity between the UE 101 and a P-GW in LTE systems.

According to various embodiments, one or more protocol entities of arrangement 900 may be implemented in UEs 501, RAN nodes 511, AMF 721 in NR implementations or MME 621 in LTE implementations, UPF 702 in NR implementations or S-GW 622 and P-GW 623 in LTE implementations, or the like to be used for control plane or user plane communications protocol stack between the aforementioned devices. In such embodiments, one or more protocol entities that may be implemented in one or more of UE 501, gNB 511, AMF 721, etc. may communicate with a respective peer protocol entity that may be implemented in or on another device using the services of respective lower layer protocol entities to perform such communication. In some embodiments, a gNB-central unit (gNB-CU) of the gNB 511 may host the RRC 955, SDAP 947, and PDCP 940 of the gNB that controls the operation of one or more gNB-distributed units (DUs), and the gNB-DUs of the gNB 511 may each host the RLC 930, MAC 920, and PHY 910 of the gNB 511.

In a first example, a control plane protocol stack may comprise, in order from highest layer to lowest layer, NAS 957, RRC 955, PDCP 940, RLC 930, MAC 920, and PHY 910. In this example, upper layers 960 may be built on top of the NAS 957, which includes an internet protocol layer (IP) 961, an Stream Control Transmission Protocol layer (SCTP) 962, and an application layer signaling protocol (AP) 963.

In NR implementations, the AP 963 may be an NG application protocol layer (NGAP or NG-AP) 963 for the NG interface 513 defined between the NG-RAN node 511 and the AMF 721, or the AP 963 may be an Xn application protocol layer (XnAP or Xn-AP) 963 for the Xn interface 512 that is defined between two or more RAN nodes 511.

The NG-AP 963 may support the functions of the NG interface 513 and may comprise Elementary Procedures (EPs). An NG-AP EP may be a unit of interaction between the NG-RAN node 511 and the AMF 721. The NG-AP 963 services may comprise two groups: UE-associated services (e.g., services related to a UE 101, 102) and non-UE-associated services (e.g., services related to the whole NG interface instance between the NG-RAN node 511 and AMF 721). These services may include functions including, but not limited to: a paging function for the sending of paging requests to NG-RAN nodes 511 involved in a particular paging area; UE Context management function for allowing the AMF 721 to establish, modify, and/or release a UE Context in the AMF 721 and the NG-RAN node 511; mobility function for UEs 501 in ECM-CONNECTED mode for intra-system HOs to support mobility within NG-RAN and inter-system HOs to support mobility from/to EPS systems; NAS Signaling Transport function for transporting or rerouting NAS messages between UE 501 and AMF 721; a NAS node selection function for determining an association between the AMF 721 and the UE 501; NG interface management function(s) for setting up the NG interface and monitoring for errors over the NG interface; warning message transmission function provides means to transfer warning messages via NG interface or cancel ongoing broadcast of warning messages; Configuration Transfer function for requesting and transferring of RAN configuration information (e.g., Self-Organizing Network (SON) information, performance measurement (PM) data, etc.) between two RAN nodes 511 via CN 520; and/or other like functions.

The XnAP 963 may support the functions of the Xn interface 512 and may comprise XnAP basic mobility procedures and XnAP global procedures. The XnAP basic mobility procedures may comprise procedures used to handle UE mobility within the NG RAN 520 (or E-UTRAN 520), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 501, such as Xn interface setup and reset procedures, NG-RAN update procedures, cell activation procedures, and the like.

In LTE implementations, the AP 963 may be an S1 Application Protocol layer (S1-AP) 963 for the S1 interface 513 defined between an E-UTRAN node 511 and an MME, or the AP 963 may be an X2 application protocol layer (X2AP or X2-AP) 963 for the X2 interface 512 that is defined between two or more E-UTRAN nodes 511.

The S1 Application Protocol layer (S1-AP) 963 may support the functions of the S1 interface, and similar to the NG-AP discussed previously, the S1-AP may comprise S1-AP EPs. An S1-AP EP may be a unit of interaction between the E-UTRAN node 511 and an MME 621within the LTE CN 520. The S1-AP 963 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 963 may support the functions of the X2 interface 512 and may comprise X2AP basic mobility procedures and X2AP global procedures. The X2AP basic mobility procedures may comprise procedures used to handle UE mobility within the E-UTRAN 520, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 501, such as X2 interface setup and reset procedures, load indication procedures, error indication procedures, cell activation procedures, and the like.

The SCTP layer (alternatively referred to as the SCTP/IP layer) 962 may provide guaranteed delivery of application layer messages (e.g., NGAP or XnAP messages in NR implementations, or S1-AP or X2AP messages in LTE implementations). The SCTP 962 may ensure reliable delivery of signaling messages between the RAN node 511 and the AMF 721/MME 621 based, in part, on the IP protocol, supported by the IP 961. The Internet Protocol layer (IP) 961 may be used to perform packet addressing and routing functionality. In some implementations the IP layer 961 may use point-to-point transmission to deliver convey PDUs. In this regard, the RAN node 511 may comprise L2 and L1 layer communication links (e.g., wired or wireless) with the MME/AMF to exchange information.

In a second example, a user plane protocol stack may comprise, in order from highest layer to lowest layer, SDAP 947, PDCP 940, RLC 930, MAC 920, and PHY 910. The user plane protocol stack may be used for communication between the UE 501, the RAN node 511, and UPF 702 in NR implementations or an S-GW ZR122 and P-GW 623 in LTE implementations. In this example, upper layers 951 may be built on top of the SDAP 947,and may include a user datagram protocol (UDP) and IP security layer (UDP/IP) 952, a General Packet Radio Service (GPRS) Tunneling Protocol for the user plane layer (GTP-U) 953, and a User Plane Protocol Data Unit layer (UP PDU) 963.

The transport network layer 954 (also referred to as a "transport layer") may be built on IP transport, and the GTP-U 953 may be used on top of the UDP/IP layer 703 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 953 may be used for carrying user data within the GPRS core network and between the radio access network and the core network. The user data transported can be packets in any of IPv4, IPv6, or PPP formats, for example. The UDP/IP 952 may provide checksums for data integrity, port numbers for addressing different functions at the source and destination, and encryption and authentication on the selected data flows. The RAN node 511 and the S-GW 622 may utilize an S1-U interface to exchange user plane data via a protocol stack comprising an L1 layer (e.g., PHY 910), an L2 layer (e.g., MAC 920, RLC 930, PDCP 940, and/or SDAP1240), the UDP/IP layer 952, and the GTP-U 953. The S-GW 622 and the P-GW 623 may utilize an S5/S8a interface to exchange user plane data via a protocol stack comprising an L1 layer, an L2 layer, the UDP/IP layer 952, and the GTP-U 953. As discussed previously, NAS protocols may support the mobility of the UE 501 and the session management procedures to establish and maintain IP connectivity between the UE 501 and the P-GW 623.

Moreover, although not shown by FIG. 9, an application layer may be present above the AP 963 and/or the transport network layer 954. The application layer may be a layer in which a user of the UE 501, RAN node 511, or other network element interacts with software applications being executed, for example, by application circuitry 605 or application circuitry 705, respectively. The application layer may also provide one or more interfaces for software applications to interact with communications systems of the UE 501 or RAN node 511, such as the baseband circuitry 610/710. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1002 may be executed to provide an execution environment for one or more network slices/subslices to utilize the hardware resources 1000. A "virtualized resource" may refer to compute, storage, and/or network resources provided by virtualization infrastructure to an application, device, system, etc.

The processors 1010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014. The processors 1010, the processor 1012, and the processor 1014, may be used to implement the application circuitry 605/705, baseband circuitry 610/710, or radio front end modules (RFEM) 615/715, as shown in FIGS. 6-7, the processing circuitry 112, storage circuitry 114, and network circuitry 116 of the vehicle 101, functions of the device 103, or any other functions of any entities in the system 100.

The memory/storage devices 1020 may include main memory, disk storage, or any suitable combination thereof. The memory/storage devices 1020 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

In some embodiments, the electronic device(s), network(s), system(s), chip(s) or component(s), or portions or implementations thereof, of FIGS. 1(*a*)-1(*g*), 2(*a*)-2(*b*), 3(*a*)-3(*b*), 4, or some other figure herein, may be configured to perform one or more processes, techniques, or methods as described herein, or portions thereof. One such process 1100 is depicted in FIG. 11.

Figure 11:
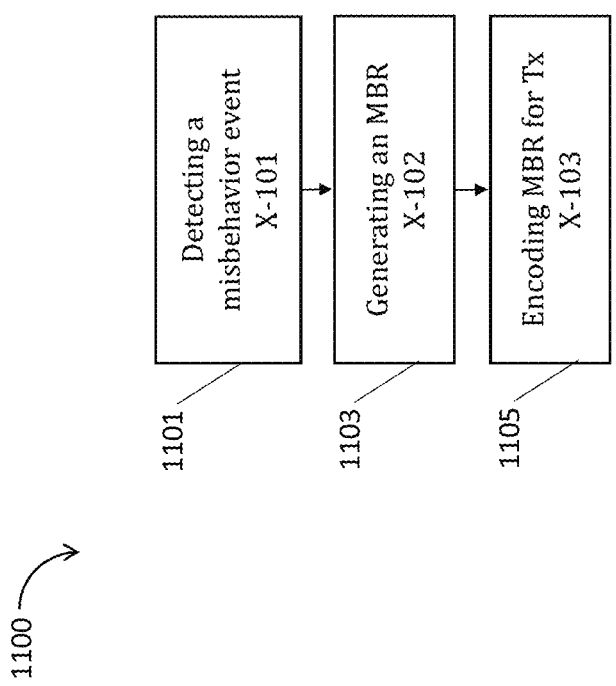
FIG. 11 illustrates an example process to be performed by various entities operations in a vehicular communication system, in accordance with some embodiments.

FIG. 11 illustrates an example process 1100 to be performed by various entities operations in a vehicular communication system, in accordance with some embodiments. In embodiments, the process 1100 may be performed by entities of the system 100 as shown in FIG. 1(*a*), and may be a complement to the process 160 shown in FIG. 1(*g*).

For example, the process may include, at a block 1101, detecting a misbehavior event. In some embodiments, the misbehavior event may be detected by one or more sensors at a particular vehicle or from other information from a component of a V2X network. If the detection is based on information from a component of the V2X network, some embodiments may include additional corroboration of the information (based on local verification or collaborative verification)

The process may further include, at a block 1103, generating a misbehavior report, e.g., by the vehicle detecting the misbehavior, or by another entity (such as another neighboring vehicle or a RSU) assisting the vehicle detecting the misbehavior. The misbehavior report may include an indication of the misbehavior event.

The process may further include, at a block 1105, encoding the misbehavior report for transmission. In some embodiments, the misbehavior report may be encoded for transmission to a misbehavior authority by the entity detecting the misbehavior or the entity generating the MBR, or by relay through one or more other vehicles or RSUs assisting the entity detecting the misbehavior or the entity generating the MBR. Additionally/alternatively, the misbehavior report may be encoded for transmission to one or more vehicles in the proximity of the misbehaving vehicle.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include one or more non-transitory, computer-readable media having instructions that, when executed by a computer processor of a device disposed at an edge of a vehicular communication network, cause the device to: generate a list of vehicle security data to be distributed to motored vehicles currently within a coverage area of the device, based at least in part on a context related to the motored vehicles; and announce, on a control channel communicatively coupling the device and the motored vehicles, that the list of vehicle security data are available and a service channel to receive the list of vehicle security data; wherein the list of vehicle security data are provided to the motored vehicles via the service channel.

Example 2 may include the one or more non-transitory, computer-readable media of example 1 and/or some other examples herein, wherein the device is a roadside unit (RSU), and at least one of the control channel or the service channel is within a dedicated short range communications (DSRC) band; or the device is a base station of a cellular network, and at least one of the control channel or the service channel is within a cellular band.

Example 3 may include the one or more non-transitory, computer-readable media of example 1 and/or some other examples herein, wherein the control channel is a control channel of IEEE Wireless Access in Vehicular Environments (WAVE) at 5.9 Ghz band, and the service channel is a non-critical service channel of IEEE Wireless Access in Vehicular Environments (WAVE) at 5.9 Ghz band.

Example 4 may include the one or more non-transitory, computer-readable media of example 1 and/or some other examples herein, wherein the instructions, when executed, further cause the device to: monitor communication messages within the coverage area through the device; identify the motored vehicles currently within the coverage area based on the monitored communication messages, wherein the list of vehicle security data is generated based on the motored vehicles currently within the coverage area, messages within the coverage area through the device, and information from a server in the vehicular communication network.

Example 5 may include the one or more non-transitory, computer-readable media of example 4 and/or some other examples herein, wherein the list of vehicle security data includes a list of security certificates for verifying authenticity or integrity of messages sent or received by the motored vehicles, and the list of security certificates are collected by the device from message signatures being verified by the device.

Example 6 may include the one or more non-transitory, computer-readable media of example 5 and/or some other examples herein, wherein the control channel is a control channel of cellular vehicle-to-everything (C-V2X) standard at 5.9 Ghz band, and the service channel is a non-critical service channel of the C-V2X standard at 5.9 Ghz band.

Example 7 may include the one or more non-transitory, computer-readable media of example 4 and/or some other examples herein, wherein the list of vehicle security data comprises a certificate revocation list (CRL) including identities of vehicles whose security certificates are to be revoked, and the CRL is obtained by customizing a global CRL with respect to the motored vehicles, and wherein the global CRL is received by the device from a server in the vehicular communication network.

Example 8 may include the one or more non-transitory, computer-readable media of example 4 and/or some other examples herein, wherein the list of vehicle security data comprises a misbehavior report (MBR) including identities of one or more misbehaving motored vehicles, and wherein an identity of a misbehaving motored vehicle is included in the MBR when a report on misbehavior of the misbehaving motored vehicle has been received from another motored vehicle, and wherein the misbehaving vehicle is within the coverage area of the device or will be within the coverage area based on a prediction according to a trajectory of the misbehaving vehicle.

Example 9 may include the one or more non-transitory, computer-readable media of example 1 and/or some other examples herein, wherein to announce on the control channel that the list of vehicle security data are available comprises to broadcast on the control channel that the list of vehicle security data are available.

Example 10 may include the one or more non-transitory, computer-readable media of example 1 and/or some other examples herein, wherein the instructions, when executed, further cause the device to: distribute the list of vehicle security data to the motored vehicles via the service channel.

Example 11 may include the one or more non-transitory, computer-readable media of example 10 and/or some other examples herein, wherein to distribute the list of vehicle security data to the motored vehicles comprises to broadcast the list of vehicle security data on the service channel.

Example 12 may include the one or more non-transitory, computer-readable media of example 10 and/or some other examples herein, wherein the list of vehicle security data is distributed to the motored vehicles accordingly to a frequency adjustable according to one or more factors of a context of the device, and wherein the one or more factors includes a tolerance level for misbehavior vehicles, a size of a global CRL, a size of a localized CRL, a channel status, or a difference between a CRL at a first time instance and a CRL at a second time instance.

Example 13 may include the one or more non-transitory, computer-readable media of example 1 and/or some other examples herein, wherein the instructions, when executed, further cause the device to: receive information from a server or one of the motored vehicles, wherein the list of vehicle security data is generated at least partially based on the received information.

Example 14 may include a method of operating a motored vehicle, comprising: receiving an announcement, by the motored vehicle, on a control channel communicatively coupling the motored vehicle with a device disposed at an edge of a network, that a list of vehicle security data are available and a service channel to receive the list of vehicle security data, wherein the motored vehicle is within a coverage area of the device; and receiving, on the service channel, by the motored vehicle, the list of vehicle security data.

Example 15 may include the method of example 14 and/or some other examples herein, further comprising: determining by the motored vehicle, another vehicle has misbehaved; and sending a misbehavior report (MBR) including an identify of the other motored vehicle to the device.

Example 16 may include the method of example 15 and/or some other examples herein, wherein the MBR further includes evidence that attests to the misbehavior of the other motored vehicle.

Example 17 may include the method of example 15 and/or some other examples herein, further comprising: broadcasting the MBR to other motored vehicles.

Example 18 may include the method of example 14 and/or some other examples herein, wherein the device is a roadside unit (RSU), and at least one of the control channel or the service channel is within a Dedicated Short Range Communications (DSRC) band; or the device is a base station of a cellular network, and at least one of the control channel or the service channel is within a cellular band.

Example 19 may include the method of example 14 and/or some other examples herein, wherein the list of vehicle security data includes a list of security certificates for verifying authenticity or integrity of messages communicated in the network, and wherein the security certificates include an intermediate certificate, a root certificate, an elector certificate, or an endorsement.

Example 20 may include the method of example 14 and/or some other examples herein, wherein the list of vehicle security data comprises a certificate revocation list (CRL) including identities of vehicles whose security certificates are to be revoked, and the CRL is received from a server in the network, and wherein the CRL is generated by the server by customizing a global CRL with respect to motored vehicles currently within a coverage area of the device.

Example 21 may include an apparatus to be used in a motored vehicle in a vehicular communication network, the apparatus comprising: processing circuitry to: determine a misbehaving motored vehicle based on misbehavior performed by the misbehaving motored vehicle; and storage circuitry, coupled to the processing circuitry, to: store an identity of the misbehaving motored vehicle in the storage circuitry; and network circuitry, coupled with the processing circuitry and the storage circuitry, to transmit a misbehavior report (MBR) including the identity of the misbehaving motored vehicle, wherein the MBR is transmitted to a server in the vehicular communication network, a roadside unit (RSU), or other motored vehicles communicatively coupled to the motored vehicle.

Example 22 may include the apparatus of example 21 and/or some other examples herein, wherein the network circuitry is to transmit the MBR by broadcasting to local neighbors of the motored vehicle who are relevant to the misbehavior performed by the misbehaving motored vehicle.

Example 23 may include the apparatus of example 21 and/or some other examples herein, wherein the MBR is a first MBR, and the network circuitry is further to receive a second MBR from the RSU or from other motored vehicles communicatively coupled to the motored vehicle.

Example 24 may include the apparatus of example 23 and/or some other examples herein, wherein the processing circuitry is to validate the second MBR at least based on sensor information local to the motored vehicle; and the storage circuitry is to store the second MBR.

Example 25 may include the apparatus of example 21 and/or some other examples herein, wherein the processing circuitry is further to continue monitor the misbehaving motored vehicle to collect more information with respect to the misbehavior performed by the misbehaving motored vehicle.

Example 26 may include a method of operating an apparatus disposed in a first vehicle, the method comprising: detecting a misbehavior of a second vehicle; and broadcast an indication of the misbehavior to other neighboring vehicles or roadside units.

Example 27 may include the method of example 26 or some other example herein, the method further comprising: encoding a report of the misbehavior to be transmitted to a misbehavior authority of a network infrastructure, wherein the report is to be transmitted directly from the first vehicle to the misbehavior authority or transmitted to the misbehavior authority via a relay that includes one or more other vehicles or roadside units.

Example 28 may include a method of operating a device, the method comprising: receiving, from a first vehicle, a misbehavior report that identifies a misbehaving vehicle; verifying the misbehavior report; checking a heading of misbehaving vehicle; and forwarding the misbehavior report to other vehicles or roadside units in a direction in which the misbehaving vehicle is heading.

Example 29 may include the method of example 28 or some other example herein, further comprising: appending additional misbehavior evidence to the misbehavior report, wherein the additional misbehavior evidence is detected by the device or reported to the device and not otherwise included in the misbehavior report as received from the first vehicle.

Example 30 may include the method of example 28 or some other example herein, wherein the device is a vehicle or roadside unit.

Example 31 may include a method of operating a device disposed within a vehicle or roadside unit, the method comprising: monitoring vehicle-to-everything (V2X) communications; and determining, based on said monitoring, one or more vehicles within a communication range of the device.

Example 32 may include the method of example 31 or some other example herein, wherein the method further comprises: receiving a global Certificate Revocation List (CRL) from a distribution center (DC) in a network infrastructure; and customizing a local CRL by extracting, from the global CRL, revoked Certificate Authority (CA) entries or revoked vehicle entries that are within the communication range and putting them together into the local CRL; signing the customized local CRL with a signing certificate; and broadcasting the signed local CRL to vehicles within the communication range.

Example 33 may include the method of example 32 or some other example herein, further comprising: receiving a plurality of global CRLs from at least one distribution center in the network infrastructure; customizing the local CRL by extracting revoked CA entries or revoked vehicle entries from the plurality of global CRLs.

Example 34 may include the method of example 31 or some other example herein, further comprising: sending an in-range vehicle list that includes all vehicles within the communication range to a distribution center at a backend infrastructure; and receiving a customized local CRL from and signed by the DC, wherein the customized local CRL only carries entries of revoked CA and revoked vehicles of or related to the one or more vehicles within the communication range; and broadcasting the customized local CRL to all vehicles within the communication range.

Example 35 may include the method of example 31 or some other example herein, further comprising: exchanging revocation information regarding the one or more vehicles with a neighbor apparatus; and distributing revocation information from the neighbor apparatus to the one or more vehicles within the communication range.

Example 36 may include the method of example 31, further comprising: announcing a local CRL service on a control channel; and broadcasting the local CRLs on a service channel.

Example 37 may include a method of operating an apparatus outside a communication range of a device disposed within a vehicle, the method comprising: requesting a local certificate revocation list, generated by the device, from a neighbor vehicle (e.g., a vehicle that is proximate to and within communication range with the apparatus).

Example 38 may include the method of example 37 or some other example herein, further comprising: receiving a request from a vehicle; and transmitting a response to the request, the response to include one or more local certificate revocation lists generated by the apparatus.

Example 39 may include a method of operating a device disposed in a first vehicle, the method comprising: detecting a misbehavior event related to a second vehicle; generating a misbehavior report that includes an indication of the misbehavior event; and encoding the misbehavior report for transmission to another vehicle to be relayed to a misbehavior authority.

Example 40 may include the method of example 39 or some other example herein, further comprising: encoding the misbehavior report for a broadcast transmission.

Example 41 may include the method of operating a device disposed in a first vehicle, the method comprising: receiving a misbehavior report from a second vehicle; validating content of the misbehavior report based on sensor information available to the device or other V2X information.

Example 42 may include the method of example 41 or some other example herein, further comprising storing, in memory at the first vehicle, indication of the validation of the content.

Example 43 may include the method of example 41 or some other example herein, further comprising: determining a direction of travel of the second vehicle; determining one or more vehicles in the direction of travel; and forwarding, based on said validating of the content, the misbehavior report to the one or more vehicles.

Example 44 may include the method of example 41 or some other example herein, further comprising performing a collaborative verification of the misbehavior report based on information received from one or more additional vehicles or RSUs.

Example 45 may include a method of operating a roadside unit (RSU), the method comprising: determining one or more vehicles within a communication range of the RSU; receiving a global CRL from a backend DC; creating a local CRL to include CA entries to be revoked and an indication of revocation of any of the one or more vehicles within the communication range; encoding the local CRL for broadcast.

Example 46 may include the method of example 45 or some other example herein, further comprising: verifying a signature of the global CRL; extracting, based on said verifying of the signature, CA revocation entries and relevant vehicle revocation entries; and creating the local CRL based on said extracting.

Example 47 may include the method of example 46 or some other example herein, further comprising: signing the local CRL with a certificate of the RSU.

Example 48 may include a method of operating a roadside unit (RSU), the method comprising: determining one or more vehicles within a communication range of the RSU; encoding, for transmission to a DC, an indication of the one or more vehicles; and processing, from the DC, a message that includes a local CRL that includes CA entries to be revoked and an indication of revocation of any of the one or more vehicles within the communication range.

Example 49 may include an apparatus, comprising: means disposed in a vehicle for detecting an inconsistency in reported V2X information by another vehicle with respect to measured properties of the other vehicle; and means for reporting the detected inconsistency to a misbehavior entity in an infrastructure.

Example 50 may include the apparatus of example 49 or some other example herein, wherein the other vehicle periodically broadcast information including at least its speed or location.

Example 51 may include the apparatus of example 49 or some other example herein, further comprising means disposed at the vehicle for sensing the other vehicle via line of sight.

Example 52 may include an apparatus for providing certificate distribution service to vehicles, comprising: means for announcing the certificate distribution service on a control channel, wherein the service provides a CA certificate dissemination service for vehicles in the apparatus' proximity; and means for providing the certificate on a service channel by compiling and broadcasting potentially missing CA certificates selected based on a context.

Example 53 may include the apparatus of example 52 or some other example herein, wherein a proximity vehicle switches to the service channel to fetch the needed CA certificate, when it fails to verify a signature of a received message due to being unable to construct a certificate chain.

Example 54 may include the apparatus of example 53 or some other example herein, wherein the proximity vehicle tunes to the service channel, on a regular basis or whenever it is idle, to pre-fetch the CA certificate.

Example 55 may include a method for sharing vehicle perception comprising: receiving, by a vehicle $v_r$, a message from a plurality of vehicles $v_s$, decoding a list of objects contained in the message, and accumulates the object; periodically fetching by $v_r$ the latest objects from all $v_s$, and aligning them to a latest timestamp; on alignment, clustering by $v_r$ the objects based at least in part on a distance metric to generate a plurality of object clusters; and on clustering, merging by $v_r$ the object clusters to produce a list of merged remote objects.

Example 56 may include the method of example 55 or some other example herein, further comprising: comparing by the list of merged remote objects with system objects; and adding by $v_r$ unmatched objects to the system objects.

Example 57 may include an apparatus comprising means to perform one or more elements of a method described in or related to any of examples 1-56, or any other method or process described herein.

Example 58 may include one or more non-transitory computer-readable media comprising instructions to cause an electronic device, upon execution of the instructions by one or more processors of the electronic device, to perform one or more elements of a method described in or related to any of examples 1-56, or any other method or process described herein.

Example 59 may include an apparatus comprising logic, modules, or circuitry to perform one or more elements of a method described in or related to any of examples 1-56, or any other method or process described herein.

Example 60 may include a method, technique, or process as described in or related to any of examples 1-56, or portions or parts thereof.

Example 61 may include an apparatus comprising: one or more processors and one or more computer-readable media comprising instructions that, when executed by the one or more processors, cause the one or more processors to perform the method, techniques, or process as described in or related to any of examples 1-56, or portions thereof.

Example 62 may include a signal as described in or related to any of examples 1-56, or portions or parts thereof.

Example 63 may include a datagram, packet, frame, segment, protocol data unit (PDU), or message as described in or related to any of examples 1-56, or portions or parts thereof, or otherwise described in the present disclosure.

Example 64 may include a signal encoded with data as described in or related to any of examples 1-56, or portions or parts thereof, or otherwise described in the present disclosure.

Example 65 may include a signal encoded with a datagram, packet, frame, segment, protocol data unit (PDU), or message as described in or related to any of examples 1-56, or portions or parts thereof, or otherwise described in the present disclosure.

Example 66 may include an electromagnetic signal carrying computer-readable instructions, wherein execution of the computer-readable instructions by one or more processors is to cause the one or more processors to perform the method, techniques, or process as described in or related to any of examples 1-56, or portions thereof.

Example 67 may include a computer program comprising instructions, wherein execution of the program by a processing element is to cause the processing element to carry out the method, techniques, or process as described in or related to any of examples 1-56, or portions thereof.

Example 68 may include a signal in a wireless network as shown and described herein.

Example 69 may include a method of communicating in a wireless network as shown and described herein.

Example 70 may include a system for providing wireless communication as shown and described herein.

Example 71 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. One or more non-transitory computer-readable media (NTCRM) comprising instructions, wherein execution of the instructions by a computer processor of a first vehicle in an vehicle communication network is to cause the first vehicle to:
   monitor communication messages within a coverage area of the first vehicle;
   identify a plurality of second neighboring vehicles within the coverage area based on the monitored communication messages;
   send a misbehavior report (MR) to a misbehavior authority (MA), wherein the MR includes an identity of a potentially misbehaving vehicle and collected evidence of misbehaviors of the potentially misbehaving vehicle, and the potentially misbehaving vehicle is within the coverage area;
   identify a certificate revocation list (CRL) generated by the MVA based on the MR, wherein the CRL includes at least one identity of at least one vehicle whose security certificate has been revoked, and the at least one identity is the identity of the potentially misbehaving vehicle when the MA determines that the potentially misbehaving vehicle is a misbehaving vehicle; and
   distribute the CRL to one or more neighboring vehicles of the plurality of second neighboring vehicles currently within the coverage area.

2. The one or more NTCRM of claim 1, wherein execution of the instructions is to cause the first vehicle to: predict trajectories of corresponding ones of a subset of the plurality of second neighboring vehicles.

3. The one or more NTCRM of claim 1, wherein, to send the MR to the MA, execution of the instructions is to cause the first vehicle to: relay the MR to the MA, wherein the MR is received from another vehicle.

4. The one or more NTCRM of claim 1, wherein execution of the instructions is to cause the first vehicle to: perform misbehavior detection to detect potentially misbehaving ones of the plurality of second neighboring vehicles.

5. The one or more NTCRM of claim 4, wherein execution of the instructions is to cause the first vehicle to: generate the MR based on the performed misbehavior detection.

6. The one or more NTCRM of claim 1, wherein execution of the instructions is to cause the first vehicle to: generate the MR based on at least one of the plurality of second neighboring vehicles and the monitored communication messages.

7. The one or more NTCRM of claim 1, wherein execution of the instructions is to cause the first vehicle to: broadcast the MR to the one or more neighboring vehicles currently within the coverage area.

8. The one or more NTCRM of claim 1, wherein the MR is digitally signed with credentials belonging to a reporting vehicle that generated the MR.

9. The one or more NTCRM of claim 1, wherein the CRL includes a list of security certificates for verifying authenticity or integrity of messages sent or received by the plurality of second neighboring vehicles.

10. The one or more NTCRM of claim 1, wherein the CRL is generated by customizing a global CRL with respect to the plurality of second neighboring vehicles within the coverage area.

11. The one or more NTCRM of claim 1, wherein, to distribute the CRL, execution of the instructions is to cause the first vehicle to: cause broadcast or unicast of availability of the CRL on a control channel; and cause broadcast or unicast of the CRL to the one or more neighboring vehicles via a service channel.

12. The one or more NTCRM of claim 11, wherein the CRL is distributed to the one or more neighboring vehicles based on one or more factors, wherein the one or more factors include a tolerance level for misbehaving vehicles, a size of a global CRL, a size of a localized CRL, a channel status, or a difference between a CRL at a first time instance and a CRL at a second time instance.

13. The one or more NTCRM of claim 1, wherein the first vehicle is a vehicle station or a roadside station.

14. A first vehicle, comprising: communication circuitry; memory circuitry; and processor circuitry connected to the memory circuitry and the communication circuitry, the processor circuitry to: monitor communication messages within a coverage area of the first vehicle; identify a set of second neighboring vehicles within the coverage area based on the monitored communication messages; and cause the communication circuitry to: send a misbehavior report (MR) to a misbehavior authority (MA), wherein the MR includes an identity of a misbehaving vehicle and collected evidence of misbehaviors of the misbehaving vehicle, and the misbehaving vehicle is within the coverage area, identify a certificate revocation list (CRL) generated by the MA based on the MR, wherein the CRL includes a list of identities of vehicles whose security certificates have been revoked, and the list of identities includes the identity of the misbehaving vehicle, and distribute the CRL to one or more neighboring vehicles of the set of second neighboring vehicles currently within the coverage area.

15. The first vehicle of claim 14, wherein the processor circuitry is to: cause relay of the MR to the MA, wherein the MR is received from another vehicle.

16. The first vehicle of claim 14, wherein the processor circuitry is to: perform misbehavior detection to detect potentially misbehaving ones of the set of second neighboring vehicles; and generate the MR based on the performed misbehavior detection.

17. The first vehicle of claim 14, wherein the processor circuitry is to: generate the MR based on at least one of the set of second neighboring vehicles and the monitored communication messages.

18. The first vehicle of claim 14, wherein the communication circuitry is to: broadcast the MR to the one or more neighboring vehicles currently within the coverage area.

19. The first vehicle of claim 14, wherein the MR is digitally signed with credentials belonging to a reporting vehicle that generated the MR.

20. The first vehicle of claim 14, wherein the CRL includes a list of security certificates for verifying authenticity or integrity of the communication messages sent or received by ones of the set of second neighboring vehicles.

21. The first vehicle of claim 14, wherein the CRL is generated by customizing a global CRL with respect to the one or more neighboring vehicles within the coverage area.

22. The first vehicle of claim 14, wherein, to distribute the CRL, the communication circuitry is to: broadcast or unicast availability of the CRL on a control channel; and broadcast or unicast the CRL to the one or more neighboring vehicles via a service channel.

23. The first vehicle of claim 14, wherein the first is a vehicle station or a roadside station.

24. A method of operating an first vehicle in an network, the method comprising: monitoring communication messages within a coverage area of the first vehicle;
identifying a plurality of second neighboring vehicles within the coverage area based on the monitored communication messages;
sending a misbehavior report (MR) to a misbehavior authority (MA), wherein the MR includes an identity of a misbehaving vehicle and collected evidence of misbehaviors of the misbehaving vehicle, and the misbehaving vehicle is within the coverage area;
identifying a certificate revocation list (CRL) generated by the MA based on the MR, wherein the CRL includes a set of identities of vehicles whose security certificates have been revoked, and the set of identities includes the identity of the misbehaving vehicle; and
distributing the CRL to one or more neighboring vehicles of the plurality of second neighboring vehicles currently within the coverage area.

25. The method of claim 24, wherein the method comprises: receiving the MR from another vehicle; and relaying the MR to the MA.

26. The method of claim 24, wherein the method comprises: performing misbehavior detection to detect the misbehaving vehicle; and generating the MR based on the performed misbehavior detection.

27. The method of claim 24, wherein the method comprises: generating the MR based on at least one of the plurality of second neighboring vehicles and the monitored ITS communication messages.

28. The method of claim 24, wherein the method comprises: broadcasting the MR to the one or more neighboring vehicles currently within the coverage area.

29. The method of claim 24, wherein the MR is digitally signed with credentials belonging to a reporting vehicle that generated the MR.

* * * * *